United States Patent [19]

Jung et al.

[11] Patent Number: 4,972,326
[45] Date of Patent: Nov. 20, 1990

[54] METHOD AND APPARATUS FOR RECORDING A FLAW IN A FABRIC WEB

[75] Inventors: Rolf Jung, Waiblingen; Albert Buss, Muensingen; Ulf Breckel, Kohlberg; Winfried Buchmann, Hemmingen, all of Fed. Rep. of Germany

[73] Assignee: Krauss u. Reichert GmbH & Co. KG Spezialmaschinenfabrik, Fed. Rep. of Germany

[21] Appl. No.: 471,001

[22] Filed: Jan. 25, 1990

Related U.S. Application Data

[63] Continuation of Ser. No. 232,710, Aug. 16, 1988, abandoned.

[30] Foreign Application Priority Data

Aug. 18, 1987 [EP] European Pat. Off. ........ 87111987.0

[51] Int. Cl.⁵ ...................... G01N 21/84; G06F 15/20
[52] U.S. Cl. .................................... 364/507; 364/552; 364/470; 250/548; 250/559; 250/562; 356/430; 356/238
[58] Field of Search ............... 364/468, 469, 470, 507, 364/552; 356/429, 430, 431, 237, 238; 340/675; 250/201, 202, 548, 559, 562, 563

[56] References Cited

U.S. PATENT DOCUMENTS

| | | | |
|---|---|---|---|
| 3,094,368 | 6/1963 | Peck | 346/33 |
| 3,540,830 | 11/1970 | DiCanio | 356/156 |
| 3,803,960 | 4/1974 | Pearl et al. | 83/56 |
| 4,173,441 | 11/1979 | Wolf | 364/507 |
| 4,176,566 | 12/1979 | Patterson et al. | 83/29 |
| 4,237,539 | 12/1980 | Piovoso et al. | 364/552 |
| 4,381,859 | 5/1983 | Jung et al. | 270/31 |
| 4,575,065 | 3/1986 | Jung et al. | 270/31 |
| 4,583,181 | 4/1986 | Gerber et al. | 364/470 |
| 4,746,020 | 5/1988 | Schenk | 364/507 |
| 4,794,678 | 1/1989 | Reim et al. | 364/470 |

FOREIGN PATENT DOCUMENTS

| | | |
|---|---|---|
| 0069061 | 1/1983 | European Pat. Off. . |
| 2525973 | 12/1976 | Fed. Rep. of Germany . |
| 2731741 | 3/1978 | Fed. Rep. of Germany . |
| 3417564 | 11/1984 | Fed. Rep. of Germany . |
| 3401826 | 10/1985 | Fed. Rep. of Germany . |
| 1077561 | 8/1967 | United Kingdom . |
| 2025083 | 1/1980 | United Kingdom . |
| 2143320 | 2/1985 | United Kingdom . |

OTHER PUBLICATIONS

"The Latest Developments and Potentials in Spreading Techniques", by Tom Young, published in the Conference Proceedings on the Conference Advanced Apparel-Cutting and Utilization Technology, Oct. 25-26, 1977.

"The Automated Cutting Room—Programmed Spreading", by Norman E. Witthauer, published in the Conference Proceedings on the Conference Advanced Apparel-Cutting and Utilization Technology, Oct. 25-26, 1977.

"Creel Spreading-A Fresh Look", by Ray Koladycz, published in the Conference Proceedings on the Conference Advanced Apparel-Cutting and Utilization Technology, Oct. 25-26, 1977.

"Marker Projection System", by Robert M. Zoot and Lloyd D. Malmstrom, published in the Conference Proceedings on the Conference Advanced Apparel-Cutting and Utilization Technology, Oct. 25-26, 1977.

Primary Examiner—Parshotam S. Lall
Assistant Examiner—Brian Mattson
Attorney, Agent, or Firm—Kramer, Brufsky & Cifelli

[57] ABSTRACT

Apparatus and a method records a flaw in a fabric web during a flaw inspection. The flaw is recorded by a mark placed on the fabric web along with the X- and Y-values of a system of points defining a boundary line around the flaw. The mark and a side edge of the fabric web, respectively, serve as reference points for these X-and Y-values.

26 Claims, 15 Drawing Sheets

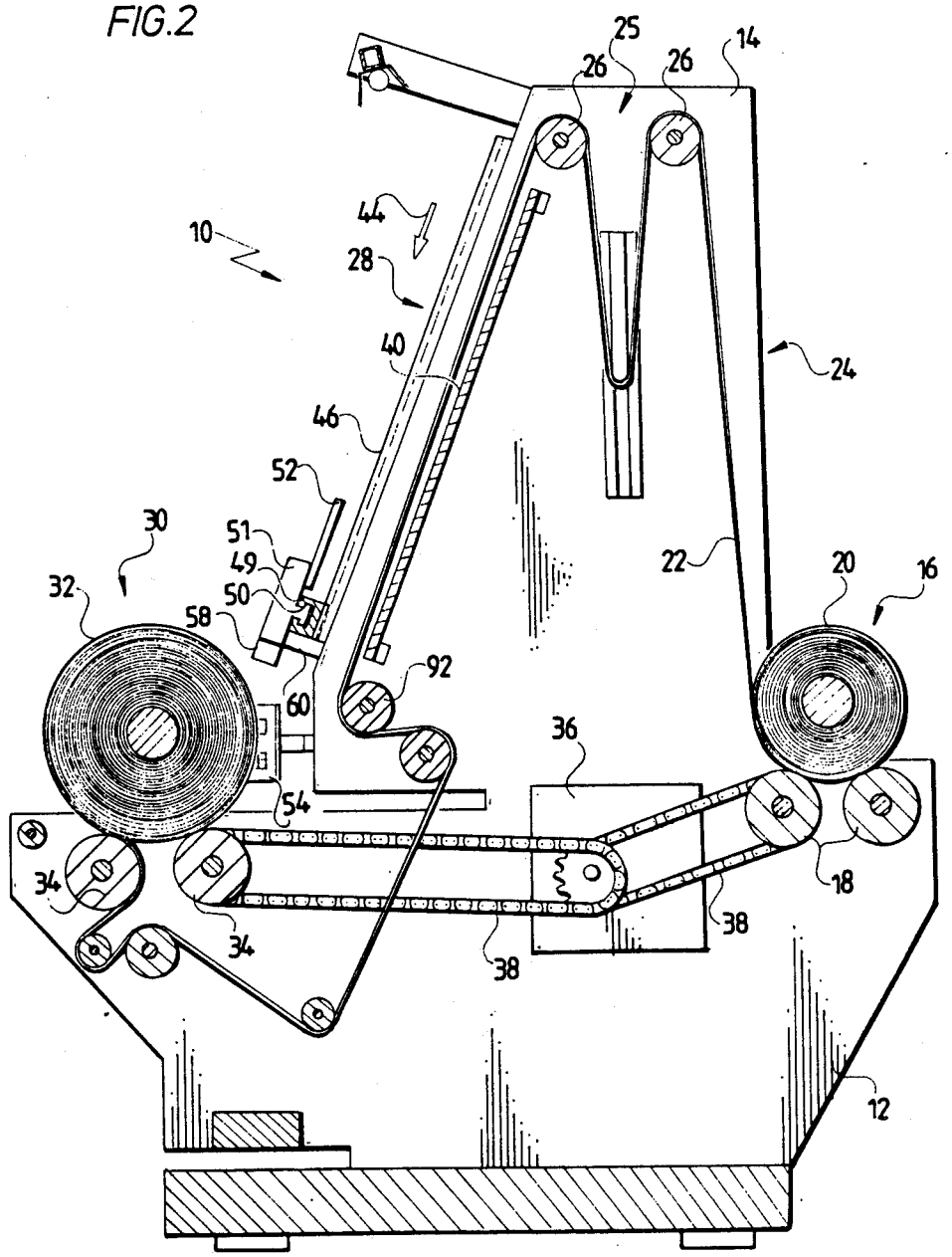

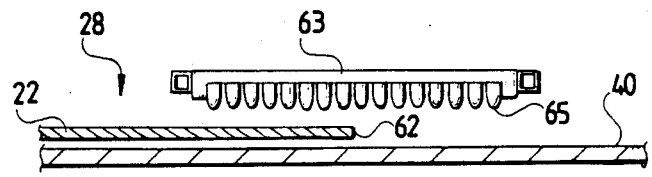
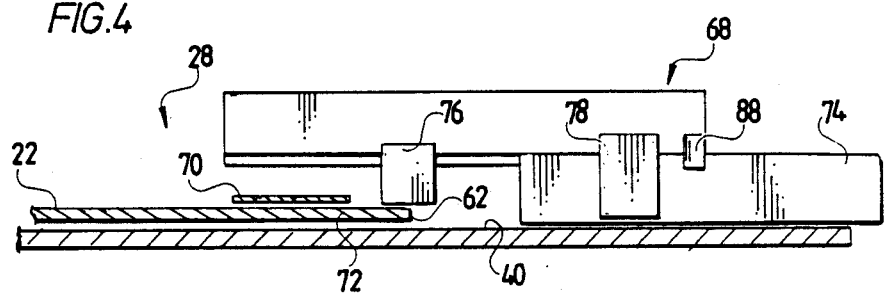
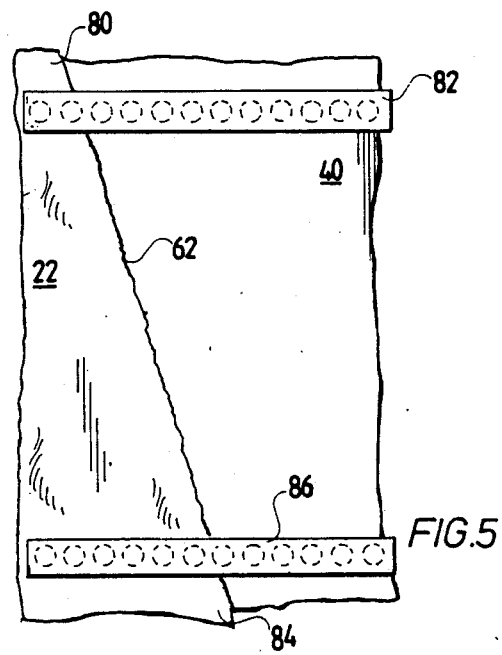
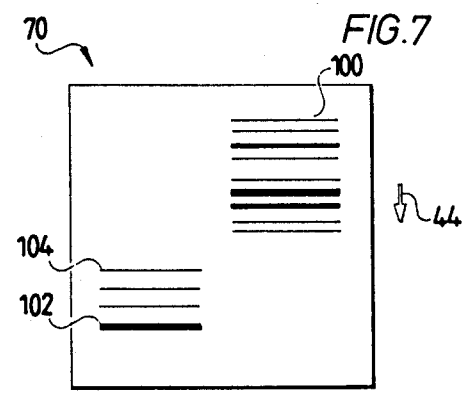

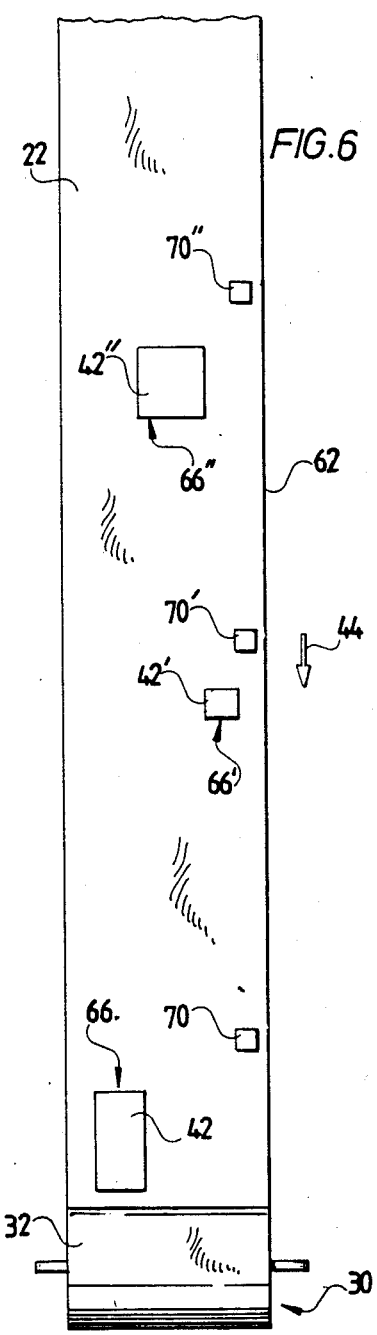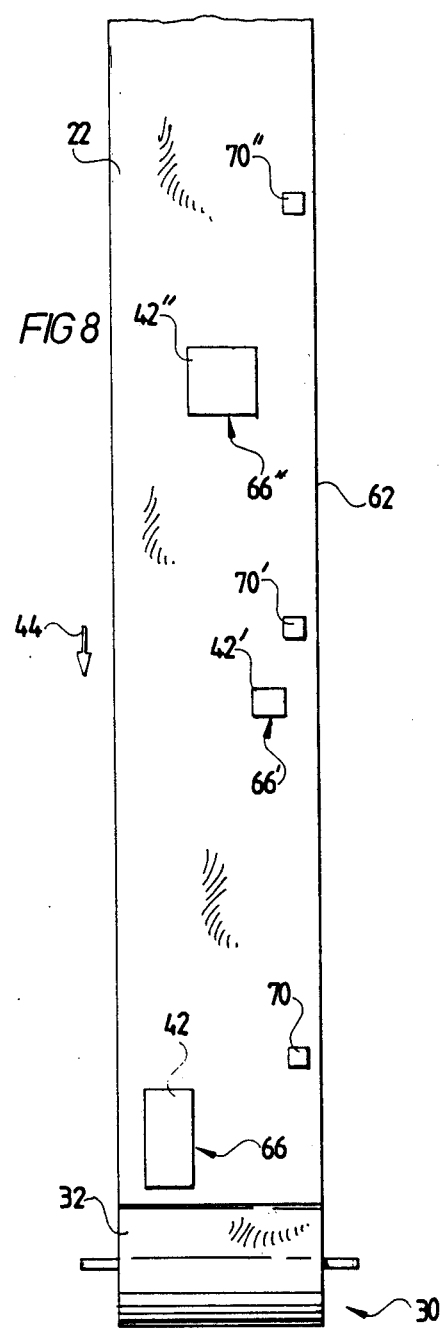

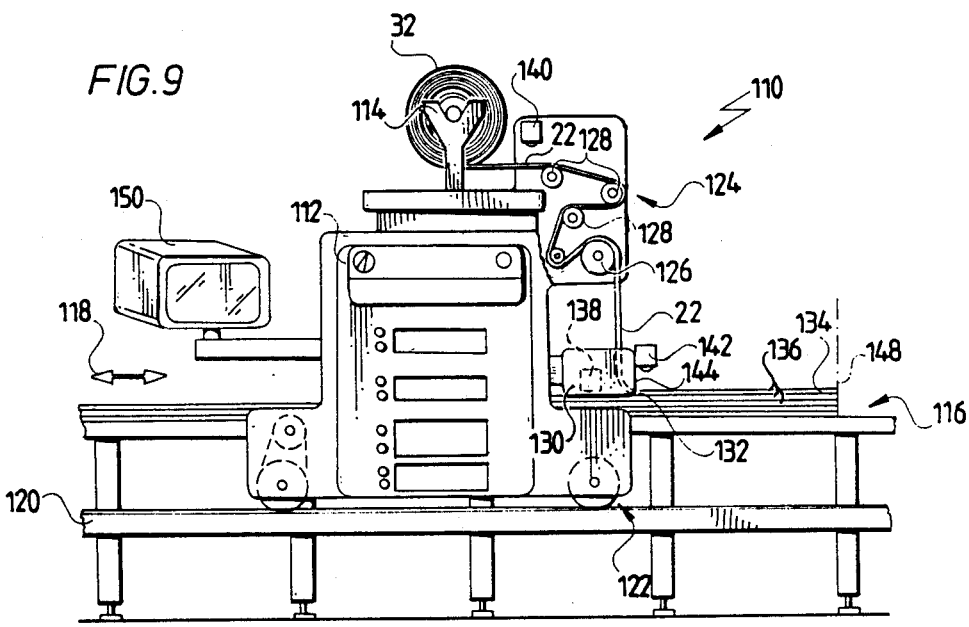
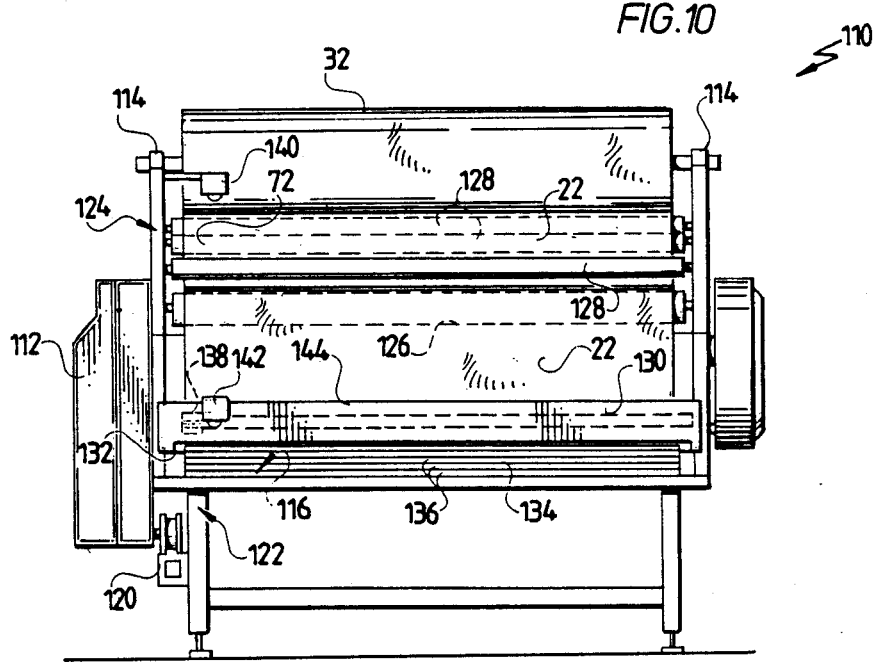

METHOD AND APPARATUS FOR RECORDING A FLAW IN A FABRIC WEB

This is a continuation of U.S. application Ser. No. 232,710, filed Aug. 16, 1988 now abandoned.

BACKGROUND OF INVENTION

The invention relates to a method and an apparatus for recording a flaw in a fabric web and to a method and an apparatus for spreading a fabric web with a flaw which has been recorded in accordance with the invention.

In particular, the invention relates to a method for recording a flaw in a fabric web during a flaw inspection in which the flaw is registered by its position in the X-direction being recorded by a mark placed on the fabric web and at least one further positional detail together with a designation of the mark.

The invention further relates to an inspection machine for recording flaws on a fabric web, in particular, for performing the above-mentioned method, comprising an inspection area, an unwinding mechanism, a winding mechanism and a registering device for the flaw including a computer unit with a data memory and also an input device for a designation of marks placed on the fabric web to identify an X-position of the flaws and for at least one further positional detail.

The invention also relates to a method for spreading a fabric web exhibiting flaws identified by marks, in which each mark is recognized by its designation, the X-value associated with this mark in the spread-out layer is determined and at least one positional detail stored in relation to this mark is transferred to a computer for comparison with a marker. In particular, this method is to be regarded as a supplement to the above-described method for recording a flaw and the inspection machine used therein.

Finally, the invention relates to a fabric spreading machine for a fabric web exhibiting flaws identified by marks, in particular, for performing the above-described method for spreading the fabric web, comprising a fabric feeding mechanism, a spreading unit with a spreading-out edge, a detector for the marks and a control system including a computer system designed to recognize the marks by their designation and to determine the X-value corresponding to the respective mark in the layer to be spread out and also to make a comparison with a marker on the basis of at least one further positional detail filed in a data memory in relation to this mark.

SUMMARY OF THE INVENTION

A method and an apparatus are known from the unexamined German Patent Application No. 3 401 826 in which the flaw is marked during a fabric inspection by a tag which is directly adhesively affixed to it. During subsequent spreading of the fabric web, this tag is recognized by a detector at the spreading machine, the precise position of the flaw relative to the marker is determined and compared with the marker and the appropriate flaw treatment corresponding to the respective location of the flaw is initiated.

From a summary of the talk by Norman E. Witthauer "The Cutting Room of the Future" published in the Conference Proceedings on the conference "Advanced Apparel—Cutting and Utilization Technology", a method and an apparatus for flaw detection are known in which the flaw is detected on an inspection machine, its X-position, i.e. its position in the longitudinal direction of the fabric web identified with a mark made on the fabric web and the Y-position of the flaw, i.e. its distance from a side edge or longitudinal edge of the fabric web is filed as a reference point in a data memory together with a designation of the mark in accordance with its sequence on the fabric web.

When the fabric web is subsequently spread, the marks are recognized in accordance with their sequence by a detector arranged on the spreading machine and so the X/Y-position of the flaw pertaining to the respective mark can be taken from the data additionally transferred to the spreading machine, and the flaw can be localized by the X-position of the mark determined by the detector and by the Y-position of the flaw which can be taken from the data. After the flaw has been localized, its extent is determined and compared with the marker. It is then ascertained whether the flaw will lie in a subsequent pattern piece or not, and this, in turn, determines the further action to be taken regarding spreading with overlaps.

This known method has the disadvantage that the flaw as such is localized during the fabric inspection but this information is inadequate for a comparision to be made with the marker during spreading without detailed registering of the flaw again since the position of the flaw as such fails to provide sufficient information concerning the question as to which pattern pieces are affected by the flaw. Therefore, in the known method, in addition to the fabric inspection, the flaw is registered again precisely during spreading, i.e. the flaw as such must be inspected twice. Also, automatic spreading, which with present-day technology can be carried out at a high spreading speed, is not possible on account of the interruptions for the flaw inspection.

The object underlying the invention is, therefore, to provide methods and apparatus of the generic kind with which a flaw need only be recorded once and with which flaw treatment with the least possible fabric usage is possible during spreading of the fabric web without inspection of the flaw again.

This object is achieved, in accordance with the invention, in a method for recording a flaw in a fabric web of the kind described at the beginning by X- and Y-values of a system of points defining a boundary line around the flaw being determined and stored as further positional details and by the mark and a side edge of the fabric web, respectively, serving as reference point for the X- and Y-values.

Accordingly, the advantage of the inventive method is that instead of the known registration of the flaw as a point during the fabric inspection, in which case the extent of the flaw is not recorded, a boundary line surrounding the flaw is registered. Therefore, the inventive method does not determine the position of the flaw itself, this being insufficient for later comparison with a marker, but instead determines immediately the extent of the flaw which is, in fact, relevant for the comparison with the marker by defining a boundary line. Owing to the boundary line of the flaw being defined, it is later clear during spreading of the fabric web which area of the fabric web should not lie in a subsequent pattern piece and, if it does fall within a later pattern piece, which piece must be spread again, if necessary, making an overlap.

With the inventive method for registering a flaw, the flaw is, therefore, clearly and adequately defined for all further operations and so inspection of the flaw can be dispensed with during all subsequent operations. In particular, it is possible for these subsequent operations to be carried out automatically.

A further advantage of the inventive solution is that by defining the boundary line around the flaw in the Xdirection in relation to the position of the mark, a very high degree of accuracy is achievable when the boundary line is reproduced during subsequent spreading, above all, with fabrics which are prone to distortion as the position of the mark to which the system of points determining the boundary line is related with respect to its X-coordinates remains unchanged even in the case of strong distortion of the entire fabric web during spreading and so even strong distortion of the fabric web affects the reproduced position of the boundary line only slightly.

In order to place the mark on the fabric web as efficiently as possible and to enable later detection as simply as possible, it is expedient for the mark to be affixed at the edge region of the fabric web.

Within the scope of the inventive method, there are basically two ways of placing the marks on the fabric web. The first possibility is for the marks to be placed at uniform distances from one another on the fabric web during the fabric inspection and for the boundary line of a flaw which may occur to then be stored in relation to the mark which was last placed. The second possibility within the inventive method is for a mark to be placed only when a flaw is discovered and for the boundary line to then be stored in relation to this mark.

With the first possibility of the inventive method, there is, in principle, usually a spacing between the mark and the boundary line since the positions of the marks placed equidistantly from one another do not normally coincide with the X-position of the flaws. With the second possibility of the inventive method, it has, however, also proven advantageous for the mark to be arranged at a distance from the boundary line in the X-direction.

In a particularly preferred embodiment for both possibilities of the inventive method, the mark is arranged behind the boundary line, viewed in the winding direction. Firstly, this facilitates the sequence of operations during the fabric inspection as the system of points defining the boundary line can be determined first and the mark need only be affixed after that, i.e. behind the boundary line, viewed in the winding direction. Secondly, during subsequent spreading when the fabric web is unwound in the direction opposite to that during the fabric inspection, there is the advantage that the mark appears first and then the boundary line of the flaw pertaining to this mark and related to this mark with respect to its X-values. During spreading of the fabric web, this also offers the possibility of initiating a braking procedure in the spreading machine once the mark occurs and of beginning with the comparison with the marker at this early stage so that before the boundary line appears on the layer to be spread, a decision has already been made as to whether and at what point spreading is to be continued with overlaps or not.

In particular, with the second possibility of the inventive method, it is then additionally possible for the mark and the boundary line to be spaced from one another by a distance corresponding to a braking distance of a spreading machine, i.e. it is possible for the braking distance of the spreading machine to be taken into account when proportioning the spacing between the boundary line and the mark.

In the embodiments of the inventive method described so far, it has not been specified in detail how the mark is to be designated. In the simplest possibility of the inventive method, the marks are designated in accordance with their sequence, i.e. successive numbers are allocated to the marks.

With this method, it must, however, be taken into consideration during subsequent spreading of the fabric web that the marks occur with their numbers in the reverse sequence.

In an improved embodiment of the inventive method, the mark is designated by a machine-readable recognition code. In this case, the marks need not necessarily be designated in accordance with their sequence but instead it is possible to select arbitrary designations from mark to mark as the positional details filed in relation to this mark can be relocated during subsequent reading of the recognition code. This improved embodiment has the further advantage that if one of the marks drops off prior to spreading, the correct boundary line can be allocated to the further marks, whereas if the marks are merely designated in accordance with their sequence, dropping-off of a mark results in the wrong boundary line, i.e. that of the mark which has dropped off being allocated to the next mark.

In principle, the coded marks can be readable in different ways. It is, for example, possible within the scope of the present invention for the marks to be designated in an inductively readable manner.

An even simpler possibility of coding the marks is for the marks to be designatd in an optically readable manner.

In a preferred form of designation, the marks are provided with several successive optically recognizable layers in the longitudinal direction of the fabric web.

A bar code is preferably used as a recognition code. Advantageously, this is readable from all directions and so no problems arise from unwinding the fabric web during spreading in the direction opposite to the winding direction during fabric inspection.

In a further embodiment in which it is unnecessary for the X/Y-values of the system of points defining the boundary line to be filed in a separate data memory, the data of the boundary line are noted in a machinereadable manner on the mark and so the mark itself simultaneously serves as data memory for the system of points defining the boundary line. In this case, a recognition code on the mark can be dispensed with since erroneous allocation of the boundary line to the respective mark is excluded.

In the embodiments of the inventive method described so far, it has not been explained in further detail how the reference point for the X-values of the system of points defining the boundary line is to be selected. In the simplest case, the mark itself can be chosen as reference point. However, this has the disadvantage that the coordinate resolution in the X-direction is limited by the size of the mark. For this reason, it is expedient for the reference point to be affixed to the mark in a machine-readable manner so that a substantially higher resolution is achievable in the X-direction by reading the reference point affixed to the mark.

There is also the danger of a reference point affixed to the mark not being able to be properly identified, for example, due to shifting of the fabric web transversely to its longitudinal direction and, for instance, being mistaken for the recognition code. For this reason, it is expedient for the reference point to be provided with an identification code so as to prevent it from being mistaken for the recognition code of the mark.

The simplest possibility is for the reference point to be defined by a reference line extending transversely to a coordinate direction. In principle, this reference point may also be a reference point for the coordinates in the Y-direction, which, for example, is advantageous if a fabric web does not have a clearly defined side edge since relation of the Y-coordinates to the side edge would involve too large an error in the respective X-value. Therefore, a relation to the side edge is established by virtue of the reference point at one location only.

If, in the inventive method, a relation to the side edge must be established in order to determine the Ycoordinates, defined as a distance from a side edge of the fabric web, there arises the, problem that the fabric web is often drawn at an incline over the inspection area during fabric inspection, and the position of the side edge cannot be acccurately determined without additional measures.

For this reason, the inventive method offers the possibility of presenting the fabric web for inspection in an edge-controlled manner and so the position of the side edge of the fabric web is clearly defined.

Alternatively, it is also possible and less involved, for each measurement of one of the Y-values, to keep the X-value constant, to determine the position of the side edge and to determine the Y-value on the basis of the position of the side edge. In other words, the positioning of the side edge is irrelevant since the respective position of the side edge is precisely determined for each measurement of a Y-value. In the above-described method for determining the Y-value, this determination can be carried out in different ways. A first way is for the position of the side edge to be measured in the case of the respective X-value.

Such measuring may prove tedious and so it is more expedient and, as far as the accuracy is concerned, in many cases sufficient for the position of the side edge to be determined in front of and behind an inspection area, viewed in the unwinding direction, and for the position of the side edge corresponding to the respective X-value to be determined by interpolation.

A major advantage of the method described so far is the fact that the boundary line of the flaw is recorded and stored with reference to the mark and so distortion of the fabric web does not significantly affect the subsequent reproduction of the boundary line. However, for coarse control of the spreading operation following the fabric inspection, it has proven advantageous in a further, more convenient embodiment of the inventive method for an approximate X-position of the mark spaced from a start of the fabric web to be registered and stored. The precision achieved by allocating the boundary line to the respective mark is not impaired by this, but with a view to achieving optimal control of the subsequent spreading procedure, it is advantageous to be able to determine in advance at which X-position of the fabric web a mark and a following flaw are to be anticipated.

In addition, the object underlying the invention is achieved, in accordance with the invention, in an inspection machine of the kind described at the beginning by the registering device comprising a markaffixing device which is preferably machine-controlled and a marking element which is displaceable in the Xand Y-directions relative to the fabric web to record a system of points defining a boundary line of the flaw, by the X- and Y-values of the system of points along which the marking element moves being recorded and transferred to the input device by displacement pickups in dependence upon a reference point defined by the mark and a side edge of the fabric web, respectively, and by the computer unit being of such configuration that the X- and Y-values of the system of points of the boundary line are allocated to the designation of the mark as further positional details and stored.

The advantage of the inventive inspection machine is that the flaw is recorded by an operator moving the marking element along the boundary line of the flaw and the inspection machine automatically determines the system of points defining the boundary line with its Xand Y-values in relation to the mark and a side edge of the fabric web, respectively, and stores these together with the designation of the mark, thereby enabling automatic further processing of the fabric web with the flaw being taken into consideration.

With the inspection machine described above, in principle, two possibilities are conceivable for recording the extent of the boundary line relative to the position of the mark in the X-direction. The first possibility is for the fabric web to be movable back and forth in the X-direction starting from a location in which the mark is positioned and for the X-displacement pickup to register the motions of the fabric web. Accordingly, in this embodiment of the inspection machine, the marking element itself is only moved in the Y-direction, i.e. transversely to the longitudinal direction of the fabric web, relative to the inspection machine, while relative motion between the fabric web and the marking element in the X-direction is brought about by the fabric web being moved back and forth in this direction. This inspection machine design is particularly well suited for cases in which the flaws extend over a substantially larger area in the Xdirection than the inspection area since the fabric web can be moved over distances of any length relative to the marking element.

However, the inspection machine design described above is disadvantageous if the fabric webs are very prone to distortion as the constant moving back and forth while the X-values of the boundary line are being determined causes distortion in the fabric web, which, as such, is undesirable and, furthermore, results in an additional measurement error due to the distortion. It is, therefore, advantageous, particularly when fabric webs prone to distortion are to undergo inspection, for the inspection machine to be designed such that the marking element is movable from an initial X-position in the X-direction relative to the inspection area and for the X-displacement pickup to register the motion of the marking element relative to the inspection area. Accordingly, with this design, the marking element itself is movable in both the X- and Y-directions relative to the inspection area. If with such an inspection machine a flaw should extend beyond the length of the inspection area in the X-direction, this flaw is to be registered by two successive boundary lines which overlap each other.

In the embodiments described so far, it has not been explained in detail how the marking element is to be mechanically supported on the inspection machine. In one embodiment, for example, the marking element is held on an articulated arm and the displacement pickups measure the articulation motions of this articulated arm and convert them into distances in the respective direction.

In a simpler structural solution, in particular, of the second embodiment of the inventive inspection machine, the marking element is held on an X-slide system. In this connection, it is then expedient for the marking element to likewise be held on a Y-slide system.

If, in conjunction with the inventive method, simultaneously with each measurement of a Y-value, the position of the side edge of the fabric web is also to be determined in the case of this Y-value, with the X-value being constant, one structural possibility is to design the inspection machine so as to enable determination of both the position of the side edge and the respective Y-value, with the X-value being constant, by the marking element. In order to avoid travel back and forth between the side edge and the Y-value to be determined, a preferred embodiment features a side edge measuring device held in accordance with the X-position of the marking element to automatically ascertain the respective position of the side edge.

As explained above in connection with the inventive method, it is advantageous for the mark to be arranged behind the boundary line, viewed in the winding direction, relative to this boundary line. For this reason, the mark-affixing device is arranged in the direction opposite to the direction in which the fabric web is wound, relative to the marking element.

With a mark-affixing device which is fixedly held on the inspection machine, problems arise if the fabric web is not fed to the inspection area with side edge control as the mark-affixing device then places the marks at different distances from the side edge of the fabric web. This may cause difficulties during subsequent spreading of the fabric web as there is no specified position of the marks transversely to the longitudinal direction. For this reason, it is advantageous for the mark-affixing device to be able to approach the fabric web in the Y-direction in a manner controlled by the side edge in order that the respective mark is always placed at the same distance from the side edge as a result of this control by the side edge.

As explained above in connection with the inventive method, it is advantageous for the mark to be provided with a machine-readable recognition code.

For this purpose, it is expedient for the mark-affixing device to be provided with a printing mechanism for applying the recognition code to the mark, thereby eliminating the necessity for the marks to have the recognition code printed on them initially.

The recognition code is advantageously a bar code and so the printing mechanism has to print a bar code which is expediently readable in the winding direction.

It has similarly been mentioned above in connection with the inventive method that it is expedient for the mark to be provided with a machine-readable reference point. In the simplest case, this reference point is defined by a bar extending transversely to the respective coordinate direction and, for safety reasons, having an associated identification code which is preferably likewise in the form of a bar code.

In connection with the inventive method, it has been mentioned above that the side edge of the fabric web must be precisely defined in order to keep the error in the determination of the respective Y-value as slight as possible. Accordingly, it is conceivable for the fabric web to be fed to the inspection area with edge control.

However, since this involves a great deal of structural expenditure, provision is made in a preferred embodiment for a side edge measuring device to be arranged in the upper and lower regions of the inspection area, in each case, thereby enabling the position of the side edge in the upper and lower regions to be determined and intermediate values to be ascertained by interpolation.

Various possibilities are conceivable for the side edge measuring devices, for example, mechanical sensors or the like. It is, however, preferable for the side edge measuring devices to be rows of sensors aligned in the Y-direction.

As a supplement to the described method for recording a flaw in a fabric web and the corresponding inspection machine, the object underlying the invention is accomplished in a method for spreading a fabric web exhibiting flaws indicated by marks, in accordance with the invention, in that after recognition of the mark, X-and Y-values of a system of points defining a boundary line of the flaw which are related to the mark and the side edge and are stored as further positional details relating to the determined X-value are transferred to the computer, and in that the position of the boundary line in the spread layer is determined on the basis of these values and the comparison with the marker is carried out subsequently.

This inventive method as a supplement to the abovedescribed method for recording the flaw has the advantage that it can be carried out fully automatically, for example, in accordance with German Patent Application No. P 37 13 010.2, to which reference is made in full, since the flaw is clearly and adequately defined by the boundary line and no further information is required for the comparison with the marker. In addition, the boundary line is clearly defined by its relation to the position of the mark in the X-direction, irrespective of a distortion in the fabric web, which eliminates the occurrence of any further errors in this respect.

Within the scope of the inventive solution for determining the X-value of the mark in relation to a start of the respectively spread layer, two different embodiments of the method are conceivable.

To determine the X-value in the first embodiment, the mark is detected when recognized in the spread-out fabric layer. In this case, it is clearly ascertainable which X-value is applicable to this mark because the respective distance has already been covered.

To determine the X-value of the mark in the other embodiment of the inventive method, the mark is detected on the fabric web between a roll of fabric and a spreading-out edge and the length of a piece of the fabric web located between detection of the mark and the spreading-out edge is ascertained and added in each case. This last mentioned method has the advantage that the detector for the mark can be arranged in the region of the piece of fabric web guided through the spreading machine, but the disadvantage that the piece of fabric web between the detector and the spreading-out edge must be precisely determinable.

In particular, to enable timely braking of the spreading carriage, it is advantageous for the mark to be detected with respect to its sequence in a piece of the fabric web facing the roll of fabric. This method has the further advantage that up until the final determining of the X-position of the mark, the data memory can seek the X/Y-values of the system of points defining the boundary line of the flaw which correspond to the sequence of the mark and so these values are already available when the X-value of the mark is determined.

It is, however, more advantageous for the mark to be recognized by a machine-readable recognition code on the mark. In this case, in order not to impede the spreading operation, it is expedient for the recognition code to be read at top spreading speed.

Determination of the precise X-position of the mark at top spreading speed does, however, result in a certain inaccuracy in the determination of the X-value. In order to determine the X-value as precisely as possible, it is, therefore, advantageous for the mark to be registered as reference point in the X-direction at reduced spreading speed.

In particular, in the first embodiment of the inventive method, in which the X-value of the mark is not determined until it is recognizable in the spread layer of fabric, to enable the spreading operation to be carried out as rapidly as possible, it is advantageous for recognition of the mark to occur before the mark is registered as reference point in the X-direction so that the braking procedure and the data search can be initiated once the mark has been recognized.

Insofar as the mark itself is provided with a reference point, higher accuracy is achieved, as explained above in connection with the method for recording a flaw, by the reference point provided on the mark being registered during the spreading operation. To exclude confusion of the reference point with the recognition code, for example, as a result of lateral shift of the fabric web, the reference point on the mark is then registered by a preceding identification code being read.

As a supplement to the aforementioned method for spreading the web of fabric, the object referred to at the beginning is accomplished with a fabric spreading machine for a web of fabric of the kind described at the beginning exhibiting flaws identified by marks, in accordance with the invention, in that the computer system has a data memory for X- and Y-values of a system of points defining a boundary line of the flaw which are related to the mark and the side edge, respectively, and in that the configuration of the computer system is such that in addition to the X-value of the mark on the layer to be spread, the X- and Y-values of the system of points are used as further positional details to determine the position of the boundary line in the layer to be spread so as to enable comparison with the marker.

Therefore, in accordance with the object underlying the invention, spreading of the fabric web can be carried out without inspection of the flaw again, for example, fully automatically, with such a fabric spreading machine.

In the described embodiment of the inventive spreading machine, arrangement of the detector has not been specified. It is advantageous for a first detector for recognizing the mark to be arranged in the region of the fabric feeding mechanism so as to enable braking of the spreading operation and location of the data corresponding to this mark in the data memory before the flaw is spread out.

Since exact recognition of the X-position of the mark on the layer to be spread out is usually not possible at top spreading speed, it is expedient for a second detector to be arranged in the region of the spreadingout edge.

Since the braking procedure is the same when each mark occurs, it has proven expedient for the control system to include means triggered by the second detector for controlling the braking operation.

In the event that the mark is provided with a recognition code, the first detector is designed to read a recognition code on the mark so that this can take place as early as possible.

In a modification of the above-mentioned embodiment in which the X-position of the mark with respect to the start of the layer to be spread is determined by the second detector arranged near the spreading-out edge, the inventive fabric spreading machine can manage with the first detector provided the length of a piece of fabric web between the detector and the cutting-off edge can be determined and transferred to the computer system as a correction value. In this case, the first detector itself is also designed to recognize the X-value of this mark, or the first detector is replaced by a second detector serving only to recognize the X-position of the mark with respect to the layer of fabric to be spread.

One possibility of enabling determination of the length of the piece of fabric web between the detector and the cutting-off edge is to design the fabric feeding mechanism and the spreading apparatus such that the piece of fabric web between the detector and the spreading-out edge exhibits the same length irrespective of vertical adjustment of the spreading unit.

Another possibility is to provide a sensor which communicates with the computer system. The sensor then measures the vertical adjustment of the spreading unit and transfers it to the computer system as correction value.

In a particularly convenient embodiment of the inventive fabric spreading machine, coarse control of the speed of the spreading carriage is effected by taking into consideration the stored approximate X-position of the marks. For this purpose, the approximate X-position of the marks must, of course, be determined during the fabric inspection and entered into the data memory of the computer system.

Further features and advantages of the invention are to be found in the following description and the appended drawings of embodiments of the invention.

BRIEF DESCRIPTION OF THE DRAWINGS

FIG. 2 is a cross-sectional view taken along line 2—2 in FIG. 1;

FIG. 3 is a partial view taken along line 3—3 in FIG. 1:

FIG. 4 is a partial view taken along line 4—4 in FIG. 1;

FIG. 5 is a partial illustration of a second embodiment of the inventive inspection machine;

FIG. 6 is a schematic illustration of a rolled-out web of fabric in accordance with the first four embodiments of the inventive method;

FIG. 7 is an enlarged illustration of a mark in FIG. 6;

FIG. 8 is an illustration similar to FIG. 6 in accordance with a fifth embodiment of the inventive method;

FIG. 9 is a schematic side view of an inventive fabric spreading machine;

FIG. 10 is a front view of the fabric spreading machine in FIG. 9; and

DETAILED DESCRIPTION OF THE PREFERRED EMBODIMENTS

Figure 1:
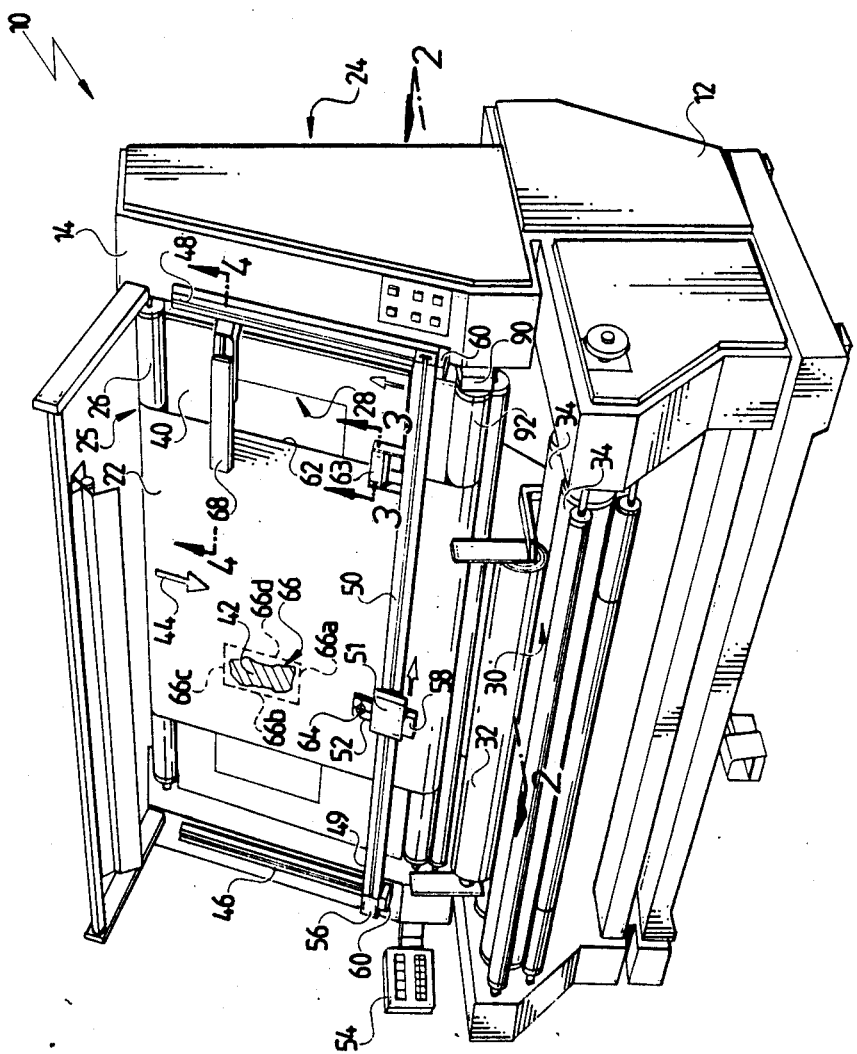
FIG. 1 is a perspective illustration of a first embodiment of an inventive inspection machine.

FIGS. 1 and 2 show a first embodiment of an inventive inspection machine designated in its entirety 10. The inspection machine 10 comprises a machine structure 12 with an inspection table 14 extending upwardly from the center of the machine structure 12. An unwinding mechanism 16 is arranged on a rear side 24 of the inspection table 14. The unwinding mechanism 16 comprises a set of support rollers 18 serving to support a roll of fabric 20 which is to be unwound.

A fabric web 22 is drawn from this roll of fabric 20 at the rear side 24 of the inspection table 14 upwards over a fabric tension regulator 25 with two top deflector rolls 26 at a front side 28 of the inspection table 14 and downwards to a winding mechanism 30.

This winding mechanism 30 likewise comprises a roll of fabric 32 which, in turn, is supported on a set of support rollers 34.

The unwinding mechanism 16 and the winding mechanism 30 are driven by a drive 36 which drives the sets of support rollers 18 and 34 via, for example, chains 38.

The fabric web 22 is inspected for flaws on an inspection area 40 located at the front side 28 of the inspection table 14. A registering device is provided for registering a flaw 42 detected on this inspection area. The registering device comprises, for example, two X-guides 46 and 48 arranged on either side of the inspection area 40 and extending parallel to an unwinding direction 44, a Y-guide 50 displaceable as X-slide 49 on these X-guides 46 and 48, and a Y-slide 51 displaceable on this Y-guide 50 transversely to the unwinding direction 44 and perpendicularly to the Xguides 46 and 48 and having a marking element 52, and a computer unit 54 with displacement pickups 56 and 58. The displacement pickup 56, held at the X-slide 49, serves, for example, as X-displacement pickup to measure the displacements of the Y-guide 50 in the X-direction starting from an initial position defined by stops 60. The displacement pickup 58, integrated into the Y-slide 51, serves, for example, as a Y-displacement pickup to record the position of the marking element 52 relative to a right-hand side edge 62 of the fabric web 22. By virtue of these two displacement pickups 56 and 58, the area in which the flaw 42 is located can be registered, in accordance with the invention, by a reticle 64 of the marking element 52 being moved, for example, by an operator around the boundary line 66 surrounding the area of the flaw 42.

In order to precisely determine the Y-value, defined as distance from the side edge 62, a side edge sensor 63 is held on the X-slide in the region overlapping the side edge 62 and in the same X-position as the reticle 64. As illustrated in FIG. 3, the side edge sensor 63 comprises, for example, reflection sensors 65 arranged in a row in the Y-direction which respond to the different reflective power of the fabric web 22 and the inspection area 40.

A mark-affixing device 68 overlapping the side edge 62 of the fabric web 22 is also provided on the inspection table 14. As illustrated in FIG. 4, marks 70 can be adhesively affixed to an edge region 72 of the fabric web 22 by the mark-affixing device 68. In accordance with the invention, this mark-affixing device 68 is mounted on a guide 74 for sliding displacement in the Y-direction and is provided with a side edge detector 76 and a Y-feed drive 78. Accordingly, the entire markaffixing device can be brought into the same position relative to the side edge 62 to affix the marks 70 to the edge region and, consequently, the marks 70 are always placed at the same distance from the side edge 62 regardless of how the side edge 62 runs on the inspection area 40.

In a second embodiment of the inspection machine, as shown in FIG. 5, instead of the side edge sensor 63, a first side edge sensor 82 is provided at a top end 80 of the inspection area 40 and a second side edge sensor 86 at a bottom end 84 of the inspection area 40 for precise determination of the position of the side edge 62 of the fabric web 22 on the inspection area 40. The first edge sensor 82 and the second edge sensor 86 may also be used to enable precise edgewise feeding of the fabric web 22 to the inspection area 40 and the winding mechanism 30. In this case, the fabric tension regulator 25 and the winding mechanism 30 are to be designed for displacement transversely to the unwinding direction 44. An exact layup of the edges of the roll of fabric 32 is also achievable in this way.

A third embodiment of the inventive inspection machine is based on a construction in accordance with the second embodiment. However, the first side edge sensor 82 is replaced by a displacement measuring device 88—additionally shown in FIG. 4—arranged in the guide 74 of the mark-affixing device. The displacement measuring device 88 measures the respective distance through which the mark-affixing device 68, likewise arranged near the top end 80 of the inspection area, is displaced in the direction towards the side edge 62 so the configuration in which the side edge 62 runs can be determined from this distance together with the bottom side edge sensor.

In a fourth embodiment of the inspection machine 10, the Y-guide 50 is held in an immovable manner on the machine structure 12. Relative displacement between the fabric web 22 and the marking element 52 in the X-direction is achieved by the fabric web being slowly moved by the drive 36 on the inspection area 40 in the unwinding direction 44 and in the opposite direction in order to register the boundary line 66. A device 90 for measuring the length of the fabric web, illustrated in FIG. 1, and connected, for example, to a bottom deflector roll 92 arranged at the bottom end of the inspection area 40 is then used as X-displacement pickup.

In the first embodiment, too, the device 90 for measuring the length of the fabric web may be used to measure the length of the fabric web 22 from its start and to file the length in relation to each mark 70, in accordance with its position relative to the start of the fabric web 22, in the data memory of the computer unit 54. The absolute position of the marks 70 cannot be exactly reproduced during subsequent spreading of the fabric web 22 as the fabric web 22 stretches to differing degrees in its longitudinal direction, however, the information on the position of the marks 70 may be useful for a special type of control system of a spreading machine, as will be explained in further detail below.

Figure 12:
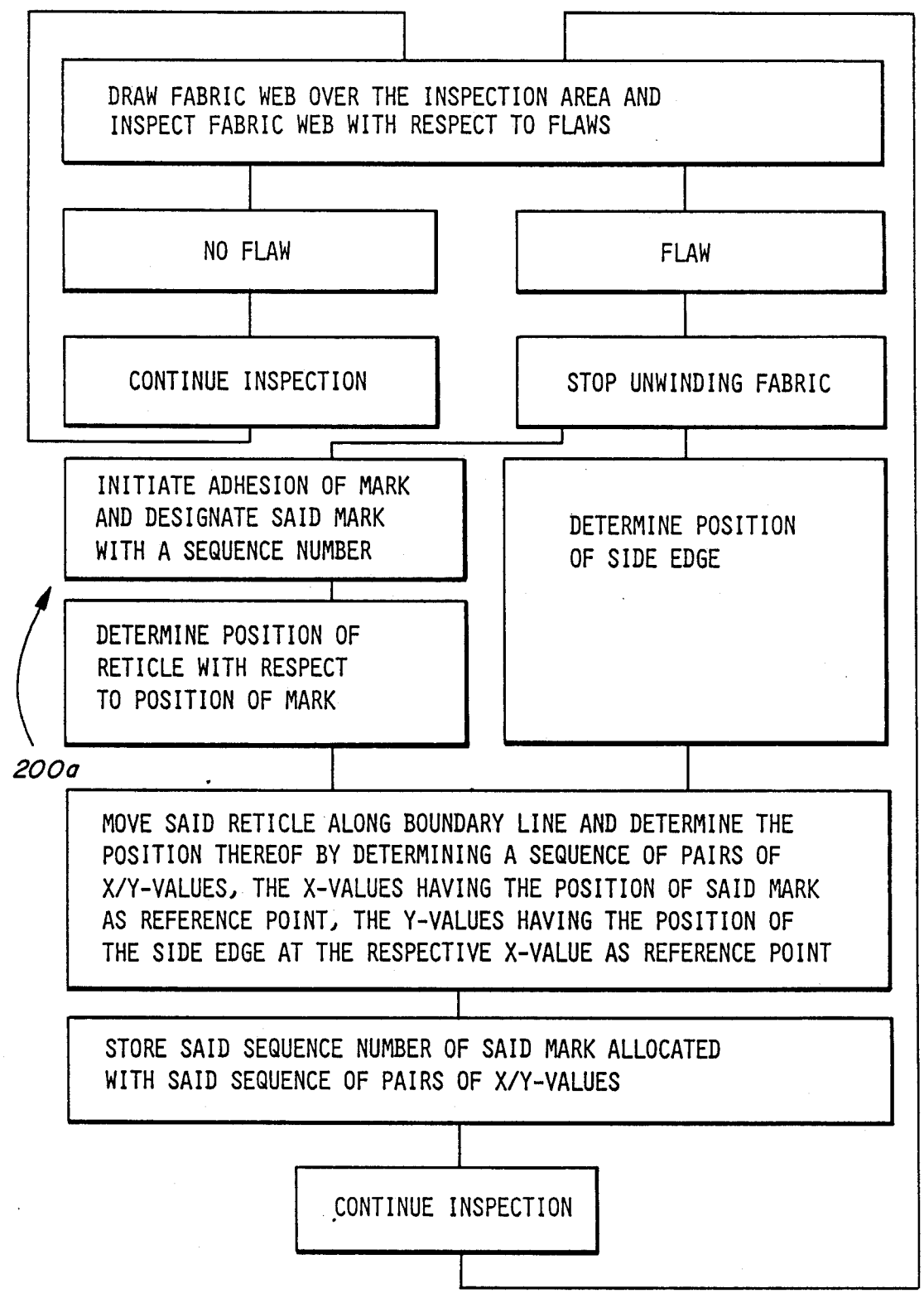
FIGS. 12–16 are flowcharts illustrating the method of flow inspection of the present invention. In particular, the description of the first embodiment of the method for flow inspection is shown in FIG. 12, the specification of the second embodiment is shown in FIG. 13, the specification of the third embodiment is shown in FIG. 14, the description of the fifth embodiment is shown in FIG. 15, and the description of the first variant of the first embodiment is shown in FIG. 16.

A first embodiment of the inventive method 200a, illustrated in FIGS. 6 and 12, is carried out as follows:

The fabric web 22 drawn over the inspection area 40 is inspected either by an operator or automatically. If a flaw 42 is detected by the operator or automatically, unwinding of the fabric roll 22 is stopped.

It is expedient for the unwinding to be stopped when the bottom boundary line 66a of the flaw area 42 comes close to the reticle 64 of the marking element 52 with the Y-guide 50 being in its bottom stop position.

The stopping of the unwinding motion is simultaneously the start command for the computer unit 54 to initiate adhesion of the mark 70 to the edge region 72 of the fabric web 22 by the mark-affixing device 68. Simultaneously, the operator or the automatic device starts to move the reticle 64 of the marking element 52 along the boundary line 66 with sections 66a, 66b, 66c and 66d surrounding the area of the flaw 42. The distances travelled are measured by both the X-displacement pickup 56 and the Y-displacement pickup 58 and transferred in the form of a system of points with corresponding X/Y pairs of values to the computer unit 54 which then files these together with the fact that the first mark 70 has been placed on the fabric web 22 in its data memory, with the distance of the mark-affixing device 68 from the initial position of the Y-guide 50 being automatically taken into account. The data memory of the first mark 70, therefore, contains all of the points defining the boundary line 66 in relation to the mark 70 in the form X/Y pairs of values.

Once the reticle 54 has moved around the boundary line 66, the inspection is continued, i.e. the fabric web 22 is drawn further over the inspection area 40 in the unwinding direction 44.

When a further flaw 42' occurs, a second mark 70' is placed and all of the data on the boundary line 66' pertaining the second flaw area 42' are filed as a function of this second mark in the same manner as described above.

Upon occurrence of a third flaw 42", the same procedure is carried out. Accordingly, after the fabric roll 20 has been unwound, the fabric roll 32 contains a number of marks 70, 70' 70", etc., designated by their sequence on the fabric web 22 as first, second and third mark, and the data on the boundary lines 66, 66', 66", etc., pertaining to these are filed in the data memory of the computer unit 54.

Figure 13:
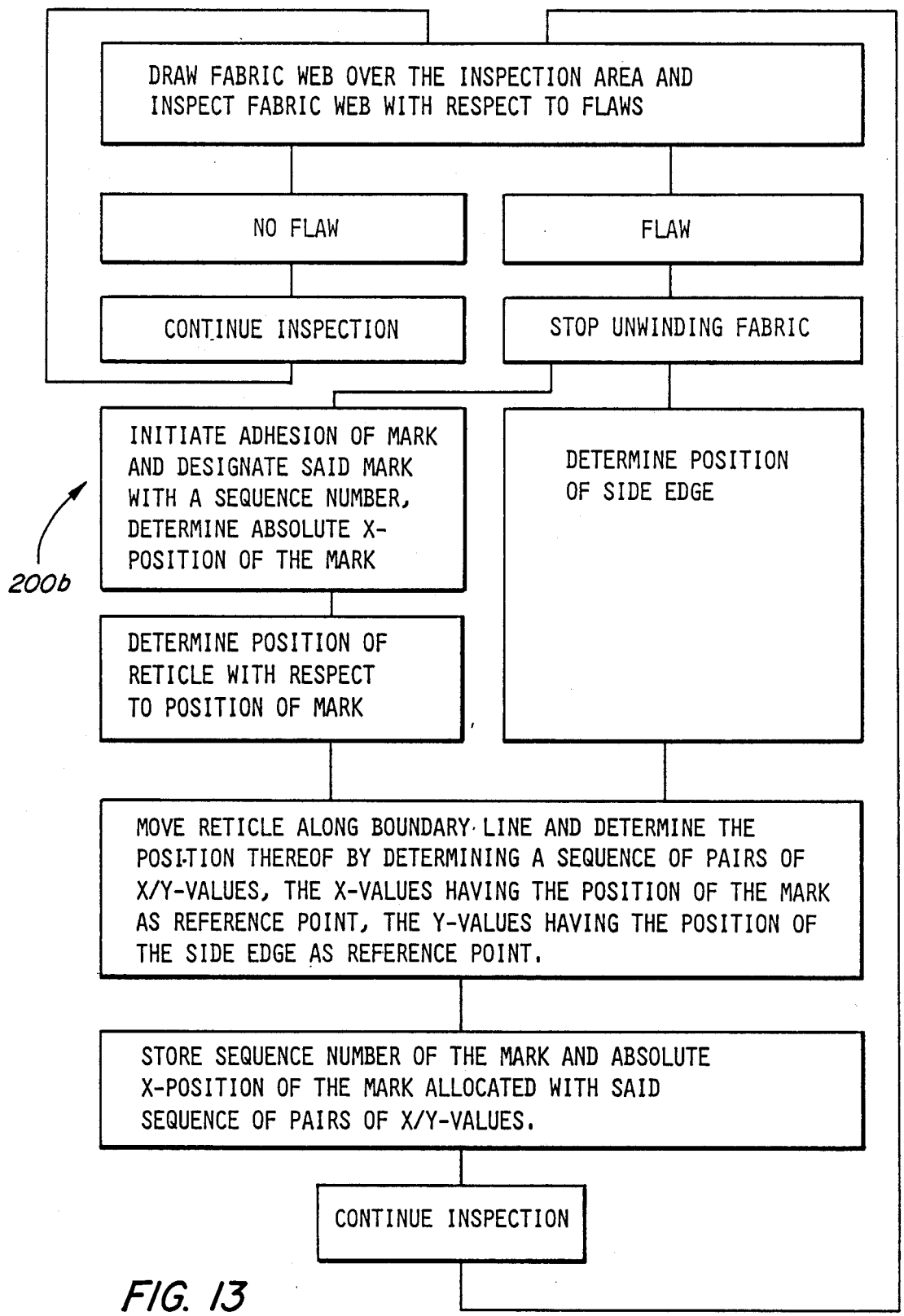

The second embodiment of the inventive method 200b, shown in FIG. 13, corresponds to the first embodiment insofar as the respective boundary lines 66, 66', 66", etc., pertaining to the respective marks 70, 70', 70", etc., are stored in the computer unit 54. It differs from the first embodiment only in that in addition to the sequence of the marks 70, 70', 70", their approximate absolute position is also stored in the data memory of the computer unit 54.

Figure 14:
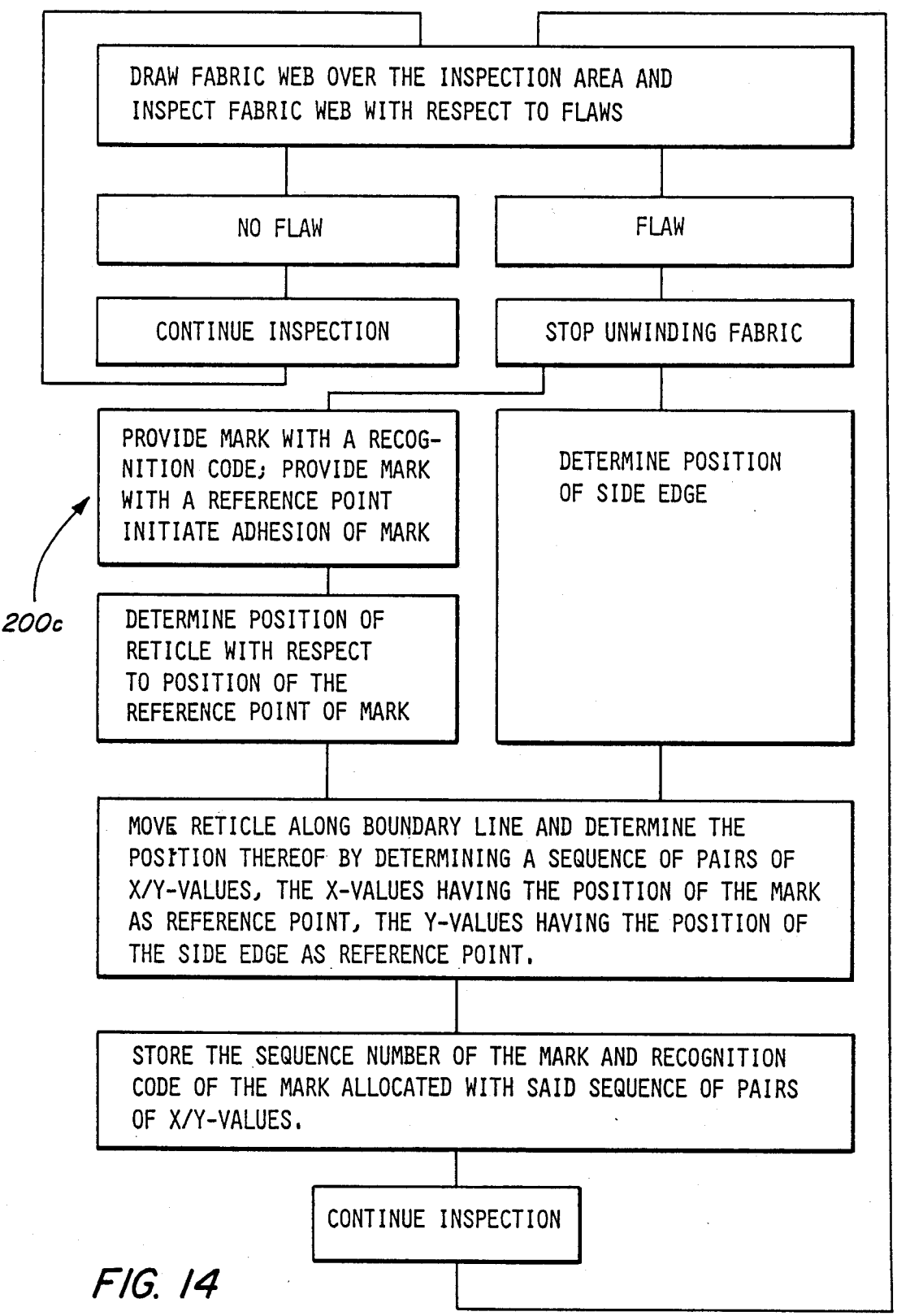
Figure 15:
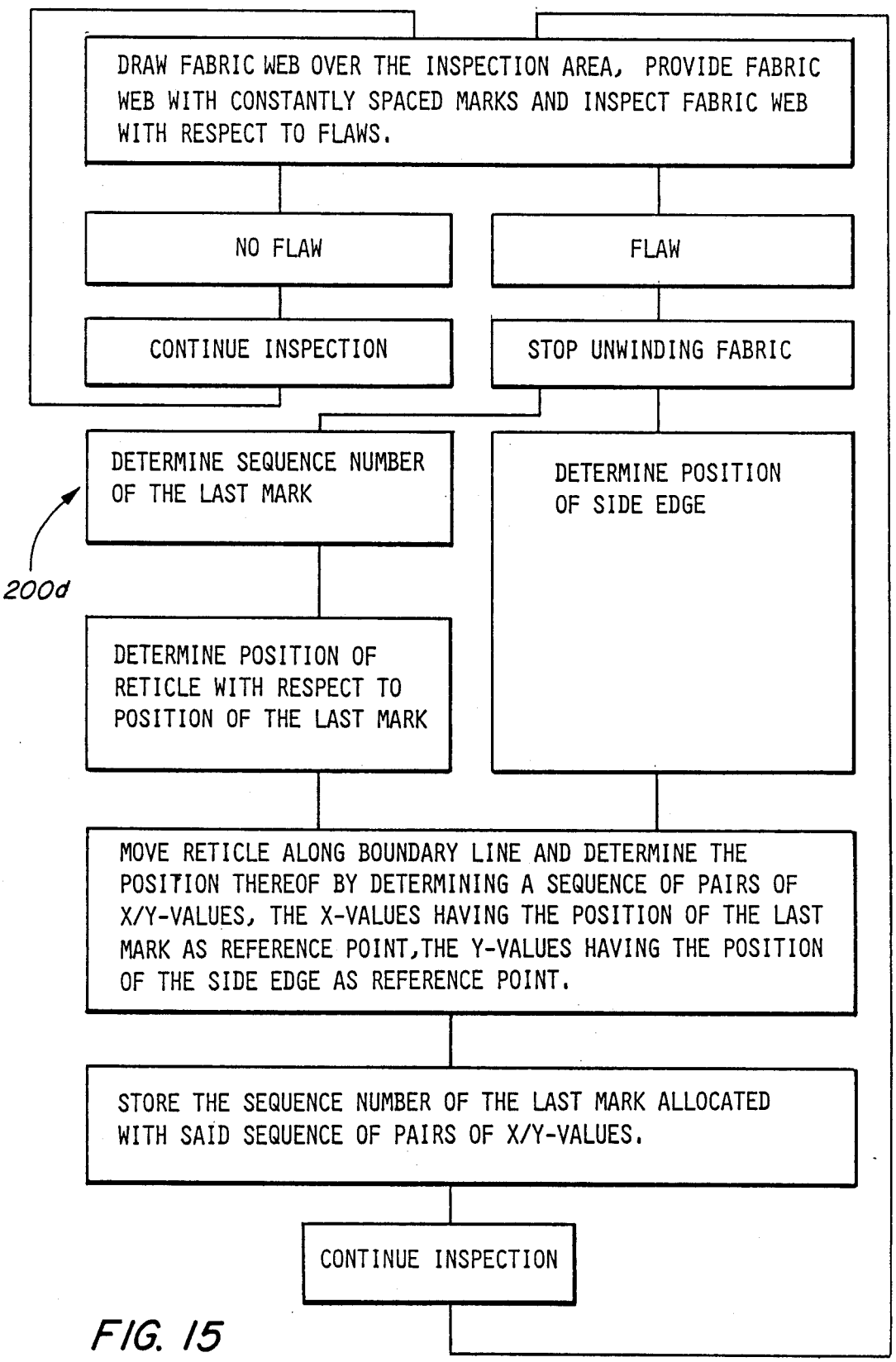

In a third embodiment of the inventive method 200c, as illustrated in FIGS. 5, 7 and 14, the marks 70, 70', 70" are designated by an additional recognition code 100.

This facilitates recognition of the sequence of the marks 70, 70', 70" and also helps to avoid incorrect indication of boundary lines 66, 66', 66", etc. during spreading if, for example, one of the marks has fallen off and been lost. In accordance with the invention, this recognition code is printed on the respective marks 70, 70', 70", etc. by the mark-affixing device 68 when they are being adhesively affixed. In the simplest case, this is a bar code.

The marks 70, 70', 70", etc. may also be provided with a reference point which permits a higher coordinate resolution of the inventive method because it is not the marks 70, 70', 70" as a whole that represent a reference point when the pertinent boundary lines 66, 66', 66", etc. are being registered, in which case the coordinate resolution would lie in the order of the size of the marks 70, 70', 70", etc. themselves, but instead the marks 70, 70', 70" exhibit, in addition, a reference point on them. If it is merely a reference point in the X-direction, as in the embodiments referred to above, the reference point may be defined by an optically recognizable bar 102. However, the reference point may also only be an optically recognizable point and, therefore, serve as reference point in both the X-direction and the Y-direction. To enable unmistakable identification of the reference point, it has, furthermore, proven expedient for the reference point to be preceded by an identification code 104, for example, in the form of three equidistantly spaced bars and so it cannot, for instance, be mistaken for the recognition code 100 when the mark is subsequently detected.

It is advantageous for the recognition code 100 and the identification code 104 to both be readable in the X-direction, i.e. for these to be bars extending in the Y-direction which start from the direction opposite to the unwinding direction 44 so that rewinding for spreading purposes can be avoided.

A fourth embodiment of the inventive method differs from the methods described so far only in that the extent of the boundary line 66 in the X-direction is registered by the device 90 for measuring the length of the fabric web instead of the X-displacement pickup 56. Otherwise, all of the procedures described so far are carried out in the same way with the fourth embodiment.

In a fifth embodiment of the inventive method 200d - sketched in FIGS. 5, 8 and 14 - in a variant of all embodiments described so far, the marks 70, 70', 70", etc. are not only placed when the fabric web 22 is stopped for registration of the boundary line 66 by the reticle 64, but rather marks 70, 70', 70" are adhered to the edge region 72 of the fabric web at uniform distances from one another in a manner controlled by the device 90 for measuring the length of the fabric web throughout the entire unwinding of the fabric web in the unwinding direction 44.

Hence, when the fabric web 22 is stopped for registration of the bottom boundary line 66a by the reticle 64, the computer unit 54 has not to initiate adhesion of a mark 70 to the fabric web 22, as in the previously described embodiments, but has instead to file the distance between the mark which has already been affixed or the next mark to be affixed and the boundary line 66a in the X-direction, measured by the device 90 for measuring the length of the fabric web, in the data memory.

The boundary line 66 is then recorded in exactly the same way as in the previous embodiments and so the filed X-value is supplemented by the X/Y pairs of values of the boundary line 66 of the respective flaw 42.

In the five embodiments of the inventive method described so far, it has not been explained in detail how the respective Y-value is ascertained when determining the X/Y pairs of values of the system of points defining the boundary line 66.

Figure 16:
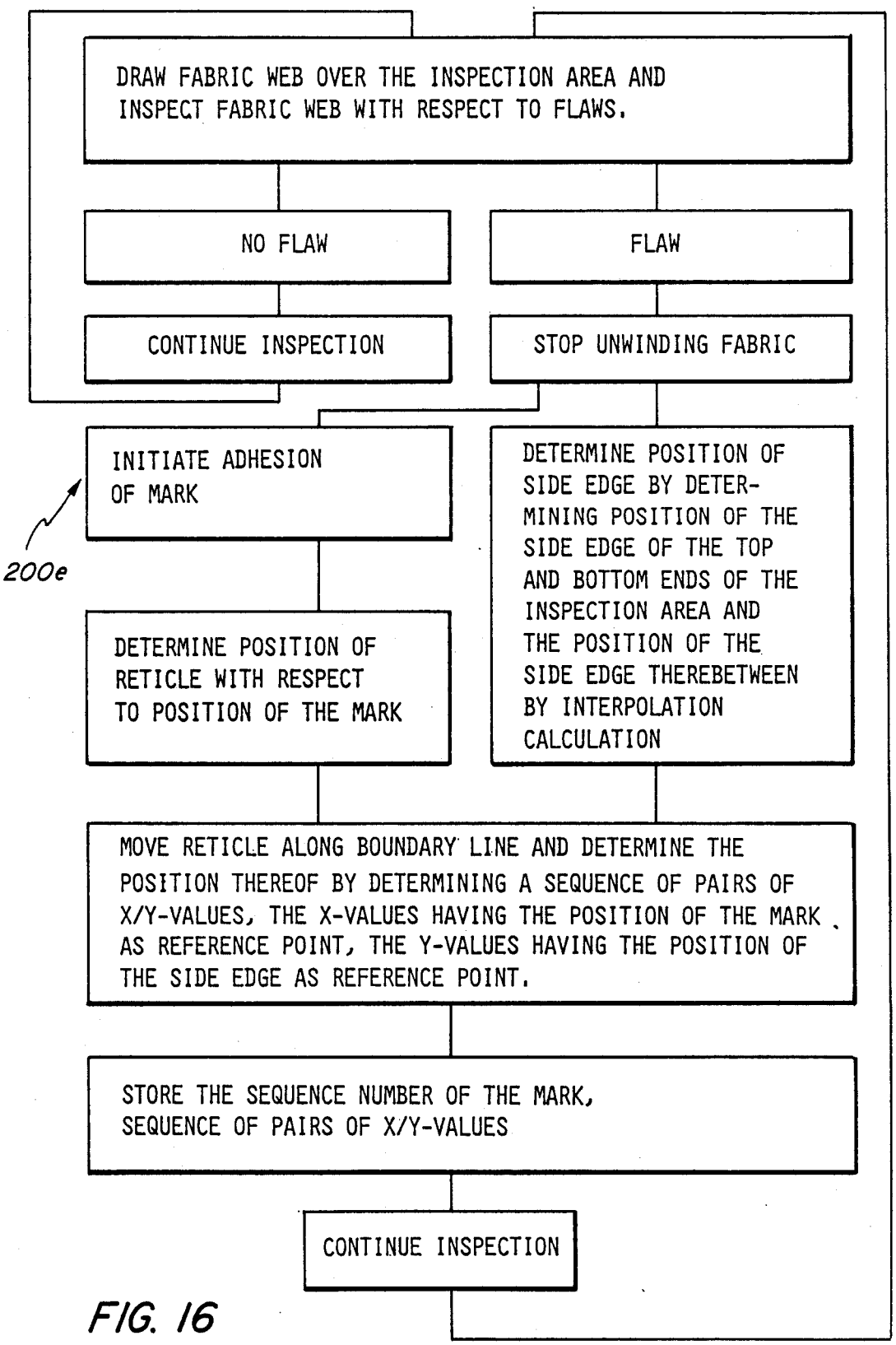

In a first variant 200e of the embodiments described above, shown in FIG. 16, the Y-value is determined via the Y-displacement pickup 58 and the side edge sensor 63. The side edge sensor 63 determines the precise position of the side edge 62 on the fabric web and so the true Y-value can be determined on the basis of this value by means of the Y-displacement pickup 58. Therefore, in this method, it is completely irrelevant whether the fabric web 22 is drawn straight or at an incline over the inspection area 40.

In another method, illustrated in FIG. 5, the position of the side edge 62 is measured via the first side edge sensor 82 and the second side edge sensor 86 at the top and bottom ends of the inspection area 40. The respective position of the side edge 62 between the first side edge sensor 82 and the second side edge sensor 86 is determined by an interpolation method which places a straight line through the position of the side edge measured by the first and second side edge sensors 82, 86. Therefore, the position of the side edge 62 between the first and second side edge sensors 82 and 86 corresponding to each X-value on the boundary line 66 that is approached by the marking element 52 can be determined by the interpolation program, and the respective Y-value is then calculated starting from the thus determined position of the side edge and using the value determined by the Y-displacement pickup 58.

The fact that the mark-affixing device 68 is displaceable in a manner controlled by the edge in the direction towards the fabric web 22 and this displacement can be recorded by the displacement measuring device 88 enables the above-described interpolation method to be performed even if the first side edge sensor 82 is missing. The position of the side edge determined by the side edge sensor 82 is replaced by the displacement determined by the displacement measuring device 88 and so the interpolation method can be carried out in the manner described above.

In a further variant of a method for precisely determining the Y-value, the fabric web 22 can be fed to the inspection area 40 with edge control. For this purpose, the fabric tension regulator 25 is displaceable transversely to the unwinding direction 44. When the fabric web 22 is fed with such edge control, it cannot run at an incline on the inspection area 40 and so the position of the side edge 62 in which it is fed to the inspection area 40 can be used as zero point for determining the respective Y-value.

After the inventive inspection method has been carried out on an inventive inspection machine, the roll of fabric 32—its fabric web 22 is illustrated in the rolled-out state in FIGS. 6 and 8—carries the marks 70, 70', 70'', etc. in the area of its flaws 42, 42', 42'', etc. Also, the X/Y pairs of values of the system of points defining the boundary line 66 are filed in the data memory of the computer unit 54 under the designation of the respective marks 70, 70', 70''.

To spread such a fabric roll 32, all of the data contained in the data memory of the computer unit 54 must, therefore, be transferred to a computer system 112 of a spreading machine designated in its entirety 110 and illustrated in FIGS. 9 and 10. The roll of fabric 32 must also be placed in a receptacle 114 provided for this purpose on the spreading machine 110.

The spreading machine 110 comprises a spreading machine structure 122 which is displaceable on rails 120 at a spreading table 116 in a horizontal direction along a double-headed arrow 118 by means of a motor not illustrated in the drawings.

This spreading machine structure 122 carries on its top section the above-described receptacle 114 for the roll of fabric 32 and a fabric feeding mechanism designated in its entirety 124 and arranged below the receptacle 114. This fabric feeding mechanism comprises several deflector rolls 128 which guide the fabric web 22 wound off the roll of fabric 32 to a feed roll 126 and ensure tension-free unwinding of the fabric web 22 from the roll of fabric 32.

The fabric web 22 falls from the feed roll 126 into a spreading unit 130 arranged in a vertically adjustable manner on the spreading machine structure 122. The spreading unit 130 spreads the fabric web 22 with a front spreading-out edge 132 so as to form a layup 134 on the spreading table 116. Since the layup 134 is to be comprised of single layers 136 lying precisely on top of one another and the flaw treatment includes severing of the fabric web 22, a cutting device 138 is also integrated into the spreading unit 130.

A first detector 140 arranged immediately after the roll of fabric 32 overlaps the fabric web 22 guided to the deflector rolls in its edge region 72. The first detector 140 serves to recognize and possibly read the marks 70 affixed to the fabric web. A second detector 142 is arranged on the spreading unit 130 on the front face 144 of the spreading unit facing away from the spreading machine structure 122. The second detector 142 serves to identify marks 70 laid out in the top layer 136 immediately after the spreading-out edge 132.

Figure 11:
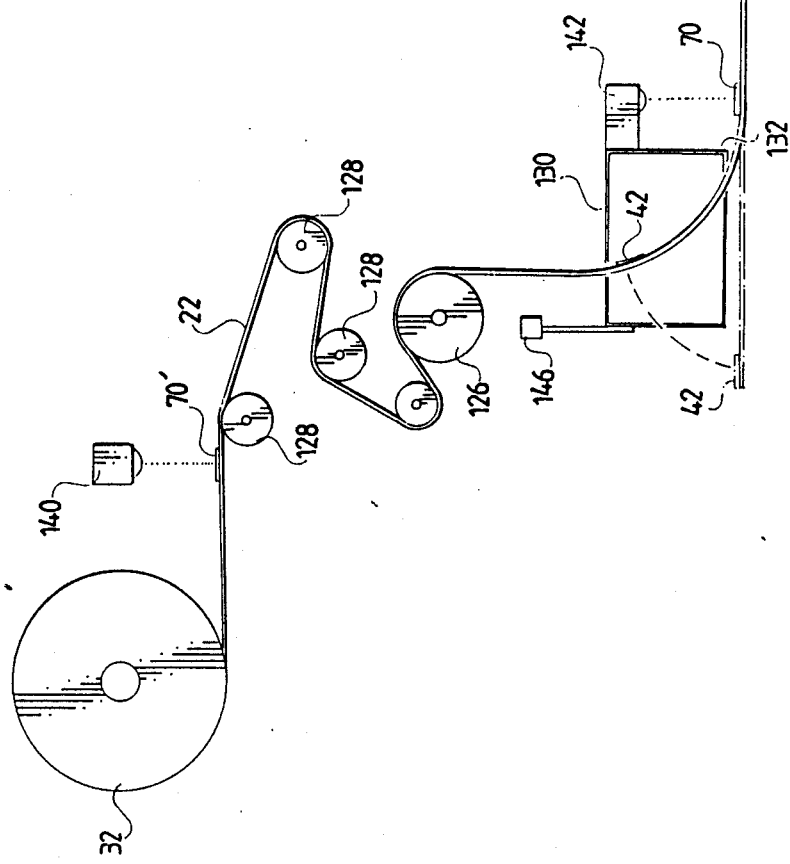
FIG. 11 is a schematic illustration of the configuration of a web of fabric in the spreading machine shown in FIGS. 9 and 10.

The arrangement of the detectors 140 and 142 in relation to the fabric web 22 guided through the spreading machine is sketched on a larger scale in FIG. 11.

In a second embodiment, as a modification of the abovedescribed first embodiment of the inventive spreading machine, the second detector 142 may be dispensed with. In this case, it must, however, be ensured that the path of the fabric web from the first detector 140 to the spreading-out edge 132 is determinable in a defined manner for the computer system 112, particularly in the case of vertical adjustment of the spreading unit 130 during spreading of the layup 134. This means that, for example, the path of the fabric web 22 from the first detector 140 to the spreading-out edge 132 is kept constant irrespective of the vertical adjustment of the spreading unit 130. Accordingly, in the case of vertical adjustment of the spreading unit 130, the deflector rolls 128 must be adjustable in accordance with the vertical adjustment of the spreading unit 130 such that a change in the spacing between the feed roll 156 and the spreading-out edge 132 is compensated by a change in the spacing between the deflector rolls 128. It is, however, also possible to leave the spacing between the deflector rolls 128 constant and to register a change in the spacing between the feed roll 126 and the spreading-out edge 132 by associating with the vertically adjustable spreading unit 130 a path measuring device 146 which registers and transfers the changes in the spacing to the computer system 112.

Figure 17:
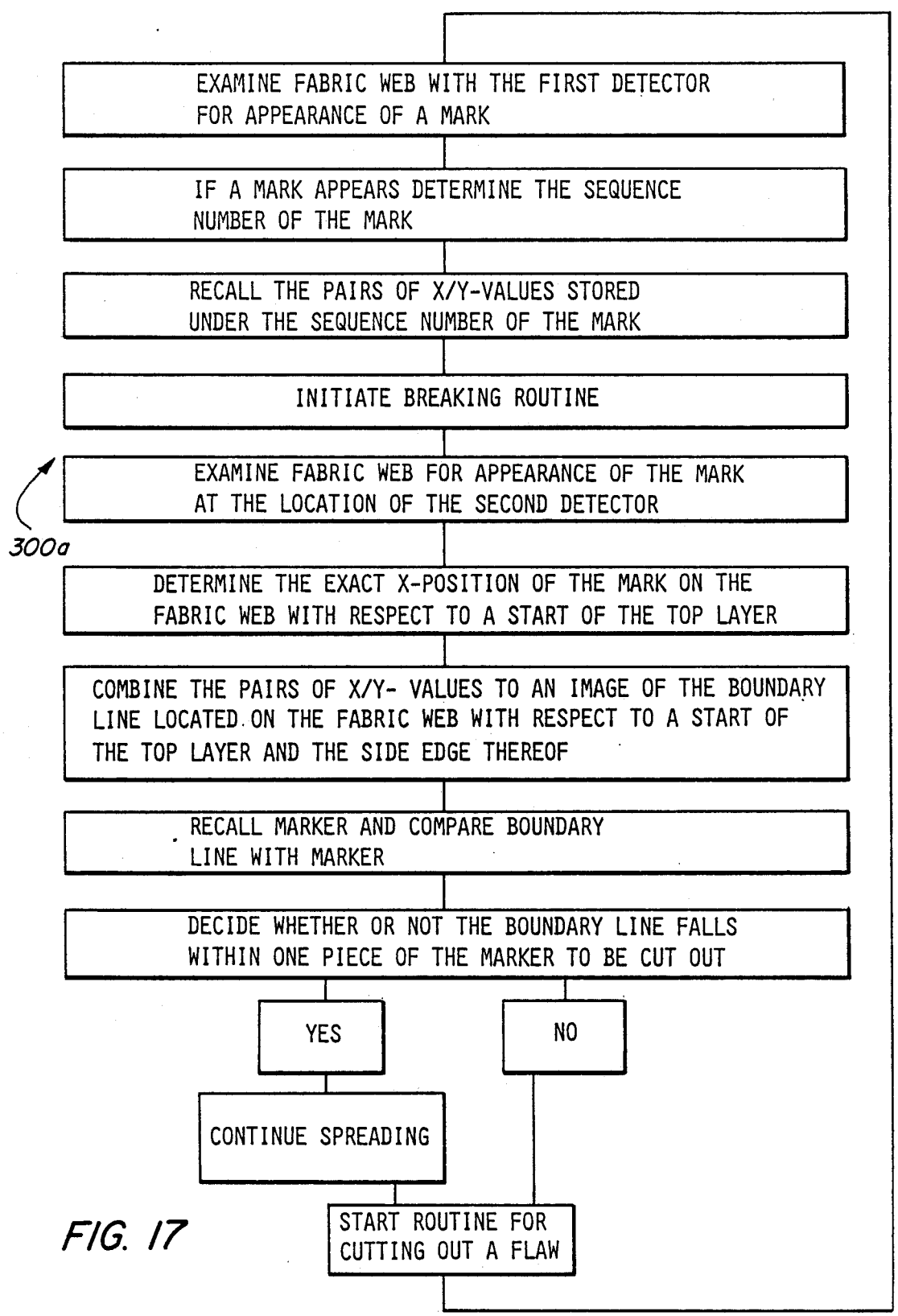
FIG. 17–20 are flowcharts illustrating the method of spreading a fabric web of the present invention. In particular, the specification of the first embodiment of the method for spreading a fabric web is shown in FIG. 17, the specification of the second embodiment of the spreading method is shown in FIG. 18, the specification of the third embodiment of the spreading method is shown in FIG. 19, and the specification of the fourth embodiment of the spreading method is shown in FIG. 20.

A first embodiment of the inventive spreading method 300a is shown in FIG. 17 and is carried out as follows:

When the fabric web 22 is rolled off the roll of fabric 23, the marks 70, 70', 70", etc., as shown in FIGS. 6 and 8, pass the detector 140 in the reverse sequence, i.e. the mark last affixed to the fabric web will now be the first one.

The computer system 112 must take this into account when allocating the. X/Y pairs of values of the system of points defining the boundary line 66.

If, for example, the mark 70" passes the first detector 140, the signal that a mark has been identified is transmitted to the computer system 112 by the first detector 140. The computer system determines which mark this is in the sequence of marks, taking into consideration the marks which have already been identified by the detector 140, and seeks the set of X/Y pairs of values of the system of points filed under the sequence of this mark in the data memory.

The computer also initiates a braking procedure in which the spreading speed and hence also the speed at which the fabric web 22 passes through the spreading machine 110 is reduced. Since the approximate distance between the first detector 140 and the spreading-edge 132 is known, the braking procedure may, for example, be controlled by a fixed braking routine such that when the mark 70" passes the spreading-out edge 32 after having gone through the spreading machine 110, the spreading speed approaches the value 0.

Once the mark 70" has passed the spreading-out edge 132, it is recognized by the second detector 142 and, therefore, at that instant, the exact X-position of the mark 70" in relation to a start 148 of the top layer 136 of the layup 134 can be determined by the computer system 112. After this X-position has been determined, the X/Y pairs of values of the system of points pertaining to this mark 70" are used to determine the exact position of the boundary line 66" on the top layer 136 which is then compared with the marker stored in the computer system 112. This marker comparison may, for example, be represented on a terminal 150. It is, however, also possible for this marker comparison to be carried out only internally by the computer without a display for the operator.

Depending on the result of this marker comparison, i.e. on whether the boundary line 66" falls within one or several of the pieces of the marker which are to be cut out, either an operator watching the terminal 150 or the computer system 112 itself can determine the point up to which spreading is continued, at which the fabric web is severed by the cutting device 138 and at which the fabric web is set down again. A method for determining stop, cut-off and restart lines is disclosed in German Patent Application No. P 37 13 010.2 to which reference is made in full in this connection.

In this embodiment it is clearly advantageous for the respective mark 70 to be placed during the fabric inspection at a distance from the boundary line 66 in the direction opposite to the unwinding direction 44 during the fabric inspection. By virtue of this spacing between the respective mark 70 and the boundary line 66, when the mark 70 is identified by the second detector 142, the flaw does not yet lie in the top spread-out layer 136 but is still in the piece of fabric web 22 guided through the spreading machine 110 and so the operator or the computer system 112 can still decide in time which action to take without having to drive back, possibly with the entire spreading machine 110, in the direction opposite to the spreading direction, and without the piece of fabric web 22 which has already been spread out having to be lifted again and wound back into the spreading machine 110.

Figure 18:
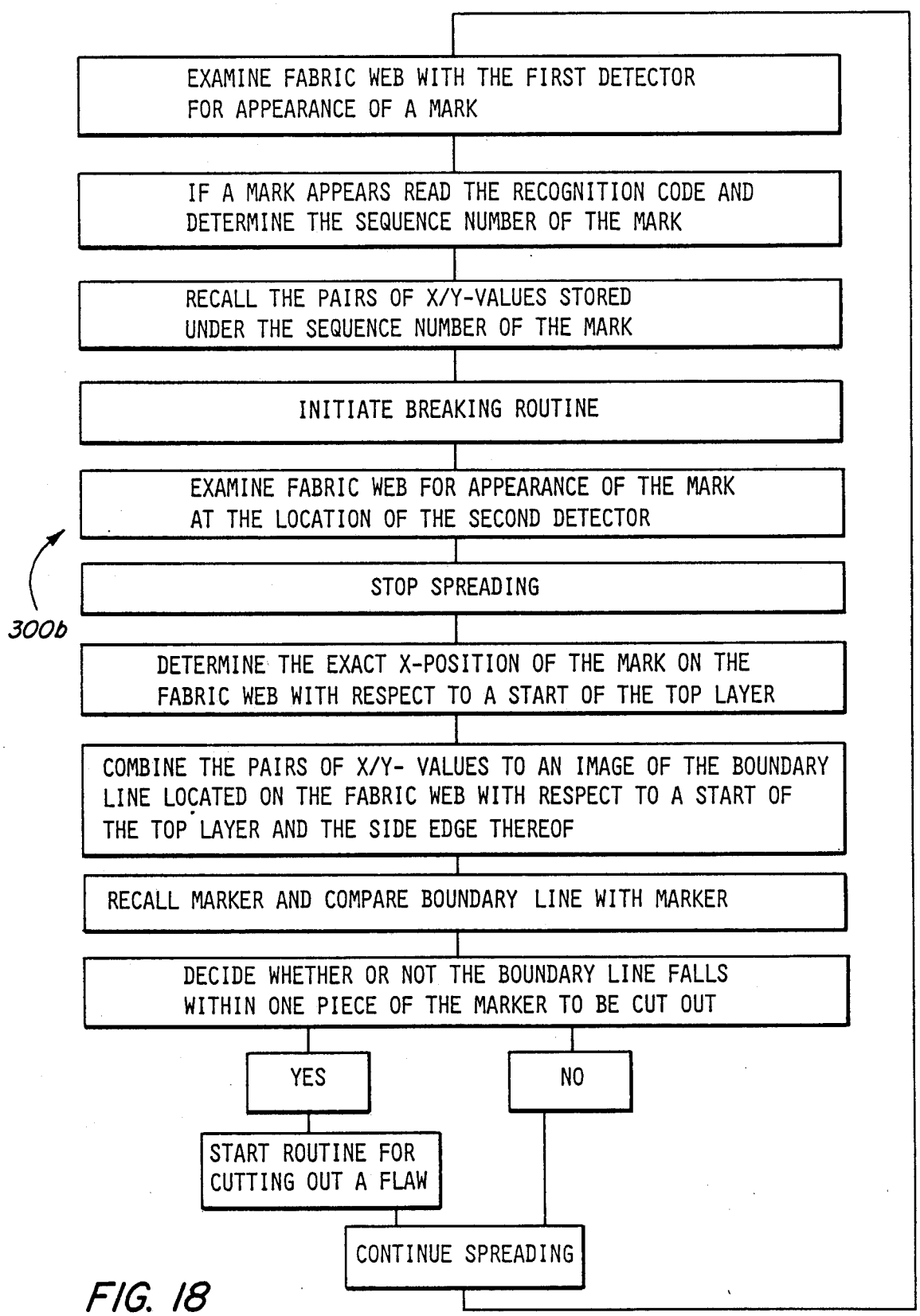

In a second improved embodiment of the inventive spreading method 300b, shown in FIG. 18, the recognition code 100 on the mark 70 is put to use. In this case, the detector 140 serves not only to recognize the fact that, for example, the mark 70 has passed it, but also to simultaneously read the recognition code 100. This reliably ensures that the computer system 112 is able to locate the X/Y pairs of values of the system of points defining the boundary line 66 corresponding to this mark 70. This is advantageous particularly if one of the marks 70, 70', 70", etc. has become detached prior to recognition by the first detector 140. In this case, the flaw corresponding to the detached mark is not recognized and not taken into account during spreading, but it is ensured that the correct flaws with the correct boundary lines are allocated to the following marks. This is not the case in the absence of a recognition code.

Figure 19:
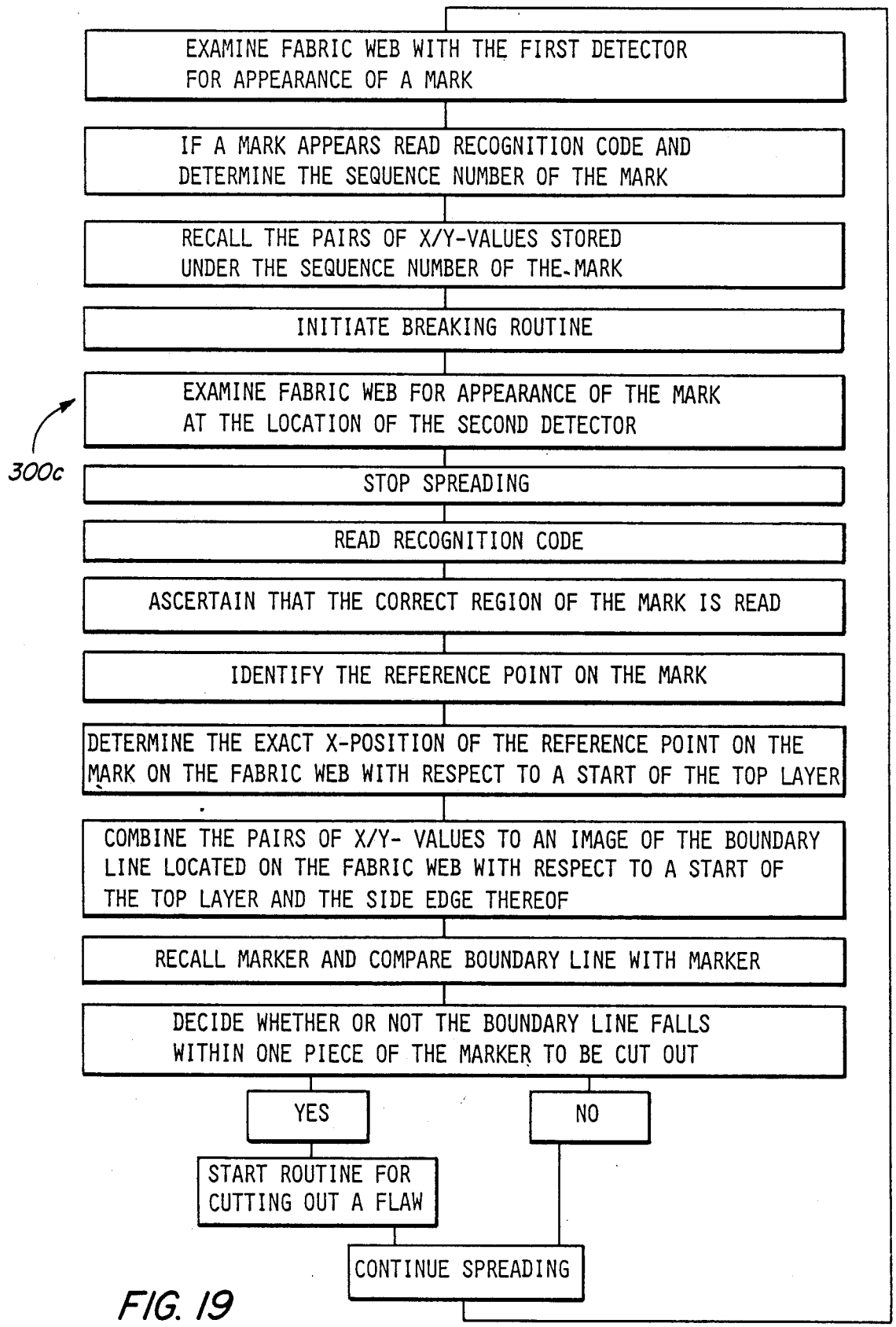

In a third embodiment of the inventive spreading method 300c, shown in FIG. 19, the second detector 142 not only detects the fact that the mark 70 has been laid out, but first ascertains again by reading the identification code 104 on this mark that the correct region of the mark 70 is read and when the reference point defined by the bar 102 then appears, determines precisely the X-value corresponding to this reference point from the start 148 of the top layer 136. Otherwise, the method is carried out in the same way as in the first embodiment.

Figure 20:
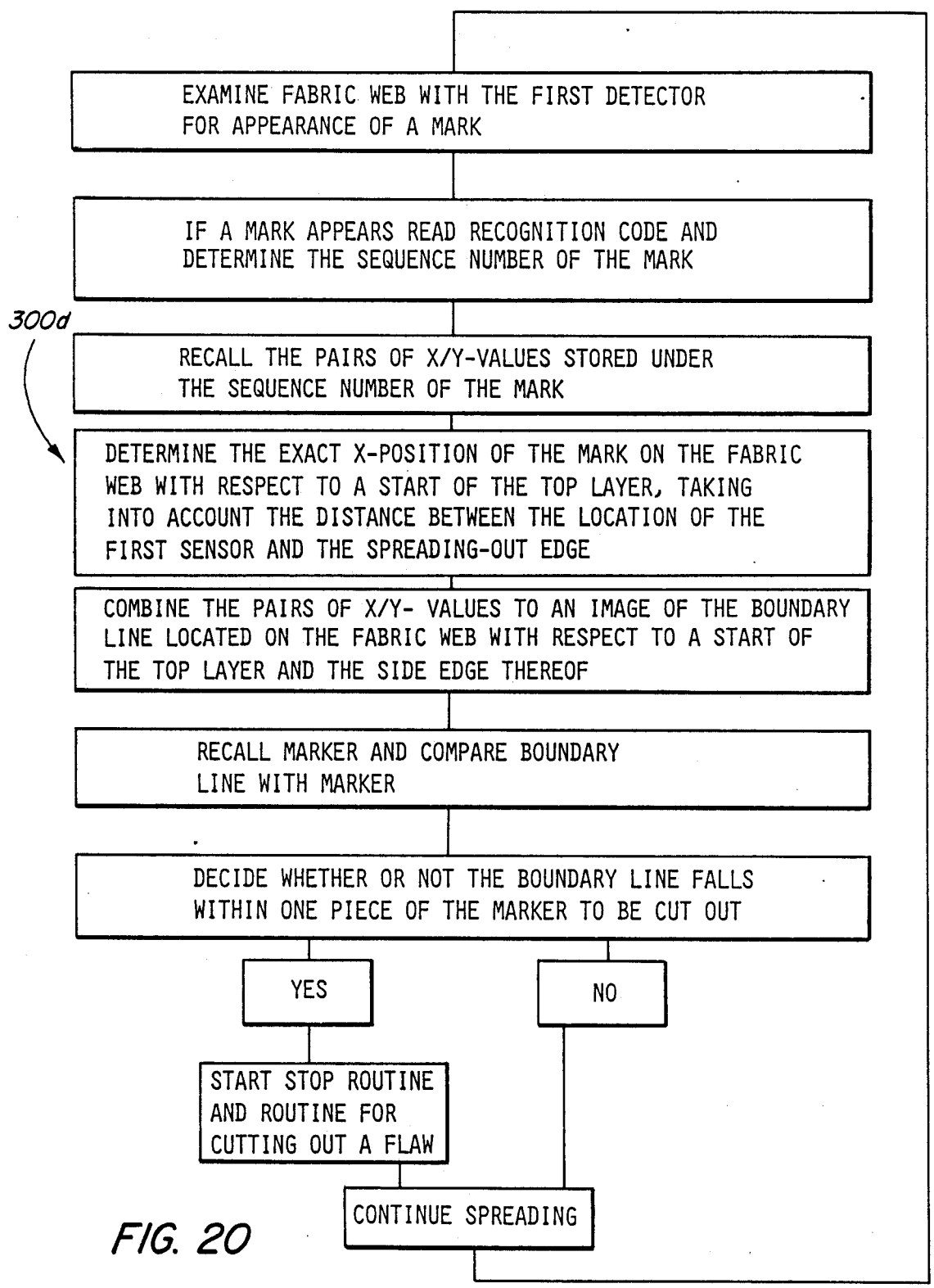

In a fourth embodiment of the inventive method 300d, shown in FIG. 20, the second detector 142 may be dispensed with. In this case, the first detector 140 serves to recognize the mark 70 as such and hence initiate the braking procedure. The first detector 140 is also capable of reading the recognition code 100. Finally, the first detector 140 is able to determine together with the computer system 112, for example, in relation to the last bar of the recognition code 100, the later X-position of this mark 70 on the top spread-out layer 136 by addition of the distance between the position of the first detector 140 and the spreading-out edge 132 which, in this method, must be determinable for the computer system, to the position of this mark 70 or the last bar of the recognition code 100. The spreading procedure is continued by the length of this added distance. Simultaneously, the X/Y pairs of values of the system of points corresponding to this mark and defining the boundary line 66 of this mark are read out and the comparison with the marker is made so that when—as determined by the computer system—the mark 70 has passed the spreading-out edge 32, either the spreading procedure is stopped to give the operator time to make the right decision with the aid of the terminal 150, or if the comparison with the marker is made by the computer system 112, in accordance with the decision made by the computer system 112 regarding the further action to be taken, the spreading procedure is continued.

Finally, it should be noted that when the marks 70, 70', 70", etc. are placed at equal spacings from one another during the fabric inspection and the X/Y pairs of values of the system of points defining the boundary line 66 are related to the mark which has already been placed, recalculation of the X-values is necessary during spreading since the X-values of the boundary line 66' following a detected mark 70" relate to the mark 70' following this detected mark 70". Recalculation is possible by the spacing between the marks 70'", 70" which have already been detected being measured during spreading and this spacing then being added to the filed X-values of the mark 70' following the detected mark 70".

If the marks 70, 70', 70", etc. are placed at uniform distances from one another during the fabric inspection, it is possible, in accordance with the invention, during the spreading procedure, particularly in the case of fabrics which are prone to distortion - to determine the distortion during spreading relative to that during the fabric inspection by measuring the distances between the marks 70", 70', 70 and, if necessary, to regulate the distortion by controlling the fabric feeding mechanism 124 via the computer system 112. It is also possible to correct the X-values of the boundary line in accordance with the measured distortion.

What is claimed is:

1. Method for recording a flaw at a position in a fabric web during a flaw inspection, comprising:
   detecting said flaw at its position in said fabric web;
   placing a mark on said fabric web;
   giving said mark a designation;
   recording said designation;
   determining a boundary line surrounding said flaw, said boundary line including a sequence of points, each of said points being defined by an X-value using said mark as a reference point and a Y-value using a side edge of said fabric web as a reference point;
   recording said sequence of points;
   and storing said sequence of points as positional information correlated with said designation of said mark for use during further processing of said fabric web provided with said placed marks after termination of said inspection of said fabric web.

2. Method as defined in claim 1, in that said mark (70) is placed on an edge region (72) of said fabric web (22).

3. Method as defined in claim 1 in that said mark (70) is arranged at a distance from said boundary line (66) in the X-direction.

4. Method as defined in claim 1 in that said mark (70) is placed behind said boundary line (66), during the fabric inspection.

5. Method as defined in claim 1 in that for each measurement of the Y-value, the X-value is kept constant, a position of said side edge (62) is determined, and the Y-value is then determined on a basis of this position of said side edge (62).

6. Method as defined in claim 5, in that the position of said side edge (62) is ascertained in front of and behind an inspection area and in that the position of said side edge (62) corresponding to the x-value is determined by interpolation.

7. Method as defined in claim 1, in that an approximate X-position of said mark (70) spaced from a start of said fabric web is registered and stored.

8. Inspection machine for recording flaws on a fabric web, comprising:
   an unwinding mechanism for feeding said fabric web to an inspection area,
   a winding mechanism for winding the fabric web having passed the inspection area,
   a registering device for the flaw attributed to said inspection area, including:
   a device for affixing a mark to said fabric web at an X-position,
   designation means for giving said mark a designation,
   a marking element displaceable in X- and Y-directions relative to said fabric web to record a sequence of points defining a boundary line of said flaw and surround said flaw,
   displacement pickup means coupled with said marking element for recording X- and Y-values of said sequence of points, said displacement pickup means using said X-position of said mark and a side edge of said fabric web as reference points for recording X- and Y-values of said sequence of points,
   input means for receiving said X- and Y-values from said displacement pickup means and a designation of said mark from said designation means,
   a computer unit with a data memory connected to said input means for correlating said designation of said mark with said X- and Y-values of said sequence of points defining said boundary line and for storing said designation of said mark with said correlated X- and Y-values for use during further processing of said fabric web bearing said placed marks after termination of said inspection of said fabric web.

9. Inspection machine as defined in claim 8, in that said fabric web (22) is movable back and forth in the X-direction starting from a location at which a mark is positioned, and in that an X-displacement pickup (92) measures motions of said fabric web (22).

10. Inspection machine as defined in claim 8, in that said marking element (52) is movable in the X-direction with respect to said inspection area (40) starting from an initial X-position, and said displacement pickup means (56) measures the motion of said marking element (52) relative to said inspection area (40).

11. Inspection machine as defined in claim 10, in that said marking element (52) is held on an X-slide system (49).

12. Inspection machine as defined in claim 10, in that said marking element (52) is held on a Y-slide system (51).

13. Inspection machine as defined in claim 10, in that a side edge measuring device (63) is provided which is held in accordance with the X-position of said marking element (52).

14. Method for spreading a fabric web exhibiting flaws, each being identified by a mark, each of said marks having its own designation, comprising:
   spreading a fabric web to a spread-out layer,
   detecting appearance of said mark,
   recording an X-position of said mark in said spread-out layer,
   recognizing said designation of said mark,
   recalling X- and Y-values of a sequence of points related to said X-position of said mark and a side edge of said fabric web as reference points and stored in correlation with said designation of said mark,
   said sequence of points defining a boundary line surrounding said flaw,
   combining said X- and Y-values of said sequence of points to form a position formation of said boundary line of said flaw in said spread-out layer,
   storing a marker defining pieces to be cut out of said spread-out fabric web,
   and comparing said position information of said boundary line with said stored marker for said fabric web for deciding whether said boundary line lies within one of said pieces to be cut out.

15. Method as defined in claim 14, in that in order to determine the X-value of said mark (70), said mark is detected when it is recognizable in said spread-out fabric layer (136).

16. Method as defined in claim 15, in that in order to determine the X-value of said mark (70), said mark is detected on said fabric web (22) between a roll of fabric (32) and a spreading-out edge (132), and the length of a piece of said fabric web (22) located between detection of said mark (70) and said spreading-out edge (132) is determined and taken into account in the determination of the X-value.

17. Method as defined in claim 14, in that after detection of said mark (70), a breaking procedure is initiated.

18. Method as defined in claim 14, in that said mark is recognized before it is registered as a reference point in the X-direction.

19. Fabric spreading machine for a fabric web exhibiting flaws, each being identified by a mark, each of said marks having a designation, comprising:
    a spreading unit with a spreading edge for depositing a spread-out layer of said fabric web,
    a detector for detection of said marks during spreading,
    a control system including a computer system and comprising said detector and means for recording an X-position of said detector with respect to said spread-out layer,
    said control system being designed to recognize said marks by their designation and to determine an X-position of each of said marks with respect to said spread-out layer,
    said control system further comprising a data memory for stored X- and Y-values of a sequence of points correlated with the designation of each of said marks and defining a boundary line surrounding each of said flaws, said X-and Y-values using as reference points said X-position of each of said marks and a side edge of said fabric web, respectively,
    and for storing a marker defining pieces to be cut out of said spread-out fabric web,
    said control system being designed to combine said X and Y-values of said sequence of points to form position information of said boundary line with respect to said spreadout layer, and to compare said position information of said boundary line and said marker for deciding whether said boundary line lies within one of said pieces to be cut out.

20. Fabric spreading machine as defined in claim 19, in that a first detector (140) for recognition of said mark (70) is arranged in a region near said fabric feeding mechanism (124).

21. Fabric spreading machine as defined in claim 20, in that a second detector (142) is arranged in the region of said spreading-out edge (132).

22. Fabric spreading machine as defined in claim 20, in that the length of a piece of said fabric web (22) between said first detector (140) and said cutting-off edge (132) can be determined and transferred to said computer system (112) as a correction value.

23. Fabric spreading machine as defined in claim 19, in that a second detector (142) is arranged in a region near said spreading-out edge (132).

24. Fabric spreading machine as defined in claim 19 in that a length of a piece of said fabric web (22) between a first detector (140) and said cutting-off edge (132) can be determined and transferred to a computer system (112) as a correction value.

25. Fabric spreading machine as defined in claim 24, in that a fabric feeding mechanism (124) and said spreading unit (130) are designed such that said piece of fabric web (22) between a first detector (140) and said spreading-out edge (132) exhibits a same length irrespective of vertical adjustment of said spreading unit (130).

26. Fabric spreading machine as defined in claim 25, in that a sensor (146) which measures vertical adjustment of said spreading unit (130) is provided which communicates with said computer system (112).

* * * * *